United States Patent
Luo et al.

(10) Patent No.: US 11,034,827 B2
(45) Date of Patent: Jun. 15, 2021

(54) HETEROPHASIC COPOLYMERS AND POLYMERIZATION METHODS

(71) Applicant: ExxonMobil Chemical Patents Inc., Baytown, TX (US)

(72) Inventors: Lubin Luo, Houston, TX (US); Xin Chen, Humble, TX (US); Yen-Hao Lin, Houston, TX (US); Anupriya Jain, Pearland, TX (US); Matthew S. Bedoya, Humble, TX (US); Medrado M. Leal, El Lago, TX (US); Rebecca C. Savage, Baytown, TX (US); Rachel G. Terry, Baytown, TX (US); Sergey Yakovlev, Baytown, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 29 days.

(21) Appl. No.: 16/379,372

(22) Filed: Apr. 9, 2019

(65) Prior Publication Data
US 2019/0330460 A1    Oct. 31, 2019

Related U.S. Application Data

(60) Provisional application No. 62/656,792, filed on Apr. 12, 2018.

(51) Int. Cl.
| | | |
|---|---|---|
| *C08L 23/16* | (2006.01) | |
| *C08L 23/12* | (2006.01) | |
| *C08L 23/14* | (2006.01) | |
| *C08J 9/36* | (2006.01) | |
| *C08J 9/40* | (2006.01) | |

(52) U.S. Cl.
CPC .............. *C08L 23/16* (2013.01); *C08J 9/365* (2013.01); *C08J 9/405* (2013.01); *C08L 23/12* (2013.01); *C08L 23/142* (2013.01); *C08L 2203/14* (2013.01); *C08L 2205/025* (2013.01); *C08L 2207/02* (2013.01)

(58) Field of Classification Search
None
See application file for complete search history.

(56) References Cited

U.S. PATENT DOCUMENTS

| | | | |
|---|---|---|---|
| 5,504,172 A | 4/1996 | Imuta et al. | |
| 5,543,438 A * | 8/1996 | Shibayama | ............ C08J 9/0061 264/477 |
| 5,643,847 A | 7/1997 | Walzer | |

(Continued)

FOREIGN PATENT DOCUMENTS

| | | | |
|---|---|---|---|
| WO | 2007/130306 | 11/2007 | |
| WO | 2014-056175 | 4/2014 | ............... C08K 3/00 |

OTHER PUBLICATIONS

Cecchin, G. et al. (2001) "On the Mechanism of Polypropene Growth over McCl2/TiCl4 Catalyst Systems," *Macromolecular Chem. and Phys.*, v. 202, pp. 1987-1994.

(Continued)

*Primary Examiner* — Chinessa T. Golden

(57) ABSTRACT

Heterophasic copolymers of propylene and an alpha olefin comonomer having a matrix phase and a fill phase, particularly, a heterophasic copolymer having a high fill phase content (greater than or equal to 50%), are provided herein. Polymerization methods and catalyst systems for producing such heterophasic copolymers are also provided.

9 Claims, 11 Drawing Sheets

(56) References Cited

U.S. PATENT DOCUMENTS

| | | |
|---|---|---|
| 7,012,121 B2 | 3/2006 | Carnahan et al. |
| 7,897,707 B2 | 3/2011 | Luo et al. |
| 7,928,172 B2 | 4/2011 | Luo et al. |
| 8,013,069 B2 | 9/2011 | Harrington et al. |
| 9,279,024 B2 | 3/2016 | Holtcamp et al. |
| 10,208,194 B2 | 2/2019 | Kerklots et al. ......... C08L 23/12 |
| 2006/0293462 A1* | 12/2006 | Jacob ...................... C08L 23/10 |
| | | 525/240 |
| 2016/0326357 A1 | 11/2016 | Dharmarajan et al. ...................... |
| | | C08L 23/14 |
| 2016/0333175 A1 | 11/2016 | Wang et al. .......... C08L 23/142 |
| 2016/0355657 A1* | 12/2016 | Luo ............................ C08J 9/00 |
| 2017/0120495 A1* | 5/2017 | Jenkins ................. B32B 27/325 |
| 2017/0306136 A1 | 10/2017 | Luo et al. ............. C08L 23/121 |

OTHER PUBLICATIONS

Rouquerol, J. et al. (1994) "Recommendations for the Characterization of Porous Solids," *Pure and Applied Chemistry*, v.8(66), pp. 1739-1758.

* cited by examiner

HETEROPHASIC COPOLYMERS AND POLYMERIZATION METHODS

PRIORITY CLAIM

This application claims priority to and the benefit of U.S. Ser. No. 62/656,792 filed Apr. 12, 2018 and is incorporated by reference in its entirety.

FIELD

This disclosure relates to heterophasic copolymers, e.g., propylene copolymers, polymerization methods and catalyst systems for producing the same.

BACKGROUND

Lower crystallinity copolymers or plastomers (e.g., heat of fusion less than 85 J/g), including heterophasic polymers comprising such, display elastic properties and are useful in many different applications such as the automotive or packaging field where excellent impact absorption or well sealing is required. Homophasic lower crystallinity copolymers, or a lower crystallinity phase in a heterophasic copolymer, particularly where the heterophasic copolymer contains a high content of lower crystallinity phase (e.g., greater 60 wt %), generally must be produced in solution phase polymerization processes. Since the solution phase polymerization process requires the product to be soluble during the polymerization process, the polymerization temperature is required to be higher, e.g., above 100° C., to ensure an all soluble homogeneous system. Therefore, compositions containing a high molecular weight component (e.g., greater than 1,000 kmol/g) are more difficult to achieve. Furthermore, these solution phase polymerization processes can utilize a solvent at temperatures above 120° C., and typically above 135° C., which is preferable in preventing reactor fouling. The reactor effluent in these processes is a liquid solution comprising the low-crystallinity copolymer or low-crystallinity phase and a substantial amount of solvent. To obtain the final product, the solvent must be separated from the product and is typically recycled, which requires specialized solvent removal and recycle equipment that are typically energy intensive. The process is time-consuming and not cost effective. Solvent removal from plastomeric materials can be challenging and can lead to residue from unreacted monomer and solvents, which can cause poor final product qualities.

Thus, it would be more efficient and economical to polymerize plastomers using a supported and/or heterogeneous catalyst system in gas or slurry phase processes. Supported and/or heterogeneous catalyst systems can be run at a significantly lower temperature, e.g., 70 to 85° C., or even 60° C. Furthermore, because the active sites can be present in various locations of a supported and/or heterogeneous catalyst particle, e.g., deep in a pore vs. near the particle surface or in a narrow pore vs. in a large pore, the derived polymer may have different microstructures compared to a polymer formed using the same catalyst precursor in a solution system; therefore, the polymers formed can display new properties, e.g., usually having higher molecular weight capabilities and broader molecular weight and comonomer distributions. However, homophasic lower crystallinity copolymers or a lower crystallinity phase in a heterophasic copolymer typically cannot be produced in a gas or slurry phase reactor because the polymer resins are sticky and can agglomerate, which can cause reactor fouling.

U.S. Pat. No. 8,013,069 reports a solution phase polymerization process using two reactors to achieve the beneficial performance characteristics of low-crystallinity copolymers while minimizing processing and handling problems associated with the low-crystallinity copolymers. In the solution phase polymerization process, a high-crystallinity polymer is produced in one reactor and a low-crystallinity polymer is produced in another reactor followed by blending in desired amounts (e.g., 10 wt % high-crystalline polymer with 90 wt % low-crystalline copolymer) to obtain a heterophasic composition. The heterophasic composition can then be pelletized to form stable pellets.

An impact copolymer (ICP) containing a stiff phase or matrix phase to protect a sticky $C_3$, $C_2$ copolymer fill phase can be made in sequential slurry reactors and gas phase reactors using Ziegler-Natta catalysts (Pasquini, N. (Ed.), *Polypropylene Handbook*, $2^{nd}$ Edition, Hanser Publisher, Munich (2005)). However, even with efforts to increase the fill phase, the upper limit of the fill phase is still only 30 wt % and the properties of the stiff phase dominate.

Therefore, a catalyst system and a polymerization process capable of producing a heterophasic copolymer with a higher semi-crystallinity polymer/copolymer fill phase content are highly desired, particularly, where the semi-crystallinity polymer/copolymer fill phase can be formed without the use of a solvent, for example in a gas phase process.

SUMMARY

It has been discovered that heterophasic copolymers containing a high content (e.g., greater than or equal to 60 wt %) of a fill phase including semi-crystallinity polymers can be advantageously achieved via sequential polymerization processes using catalyst systems comprising a single-site precursor compound, an activator and a support and without the use of a solvent.

In any embodiment, a heterophasic copolymer comprising (or consisting of, or consisting essentially of) a matrix phase and a fill phase is provided. The matrix phase may have a melting point of at least 100° C. The matrix phase may include (i) at least 95 mol % propylene-derived units, or (ii) at least 95 mol % ethylene-derived units. Further, the matrix phase may be a sponge-like structure having an average wall thickness of up to 3 µm. The matrix phase may include at least 8 wt % of the heterophasic copolymer, based on the total weight of the matrix and fill phases. The fill phase may be present as domains at least partially filling pores in the matrix phase. The domains may have an average area of 0.5 to 20 µm². The fill phase may include (i) at least 60 mol % propylene-derived units and at least 5 mol % ethylene-derived units, or (ii) at least 60 mol % ethylene-derived units and at least 5 mol % propylene-derived units. The fill phase may have a heat of fusion less than or equal to 85 J/g. The fill phase may include at least 60 wt % of the heterophasic copolymer, based on the total weight of the matrix and fill phases.

The phase "sponge-like" is used to describe the macroscopic appearance of the heterophasic copolymer in its reactor, non-melted form, having a sponge-like matrix phase which is preferably a homopolypropylene and the otherwise open pores filed with the "fill phase" which is most preferably an EP plastomer.

In another aspect, embodiments for producing a heterophasic copolymer comprising (or consisting of, or consisting essentially of) a first stage and a second stage are provided. The first stage may include contacting propylene monomer or ethylene monomer with or without a comonomer under a first set of polymerization conditions with a catalyst system to form a matrix phase of the heterophasic copolymer including at least 90 wt % propylene or ethylene derived units. The catalyst system may include a single-site catalyst precursor compound, an activator, and a support having: (i) a surface area of 400 to 800 m²/g or more, (ii) an average particle size of 60 to 250 (suggested 200 because 150 has shown significant heat removal difficulty) μm, and (iii) optionally, sub-particles having an average particle size of 0.01-5 μm. The second stage may include contacting ethylene monomer and optionally, propylene monomer, with the matrix phase under a second set of polymerization conditions to form a fill phase for pores of the matrix in the heterophasic copolymer. The second stage may be performed substantially without solvent. The first and second stage are performed in the same or different reactors.

DETAILED DESCRIPTION

I. Definitions & Measurement Techniques

Figure 1:
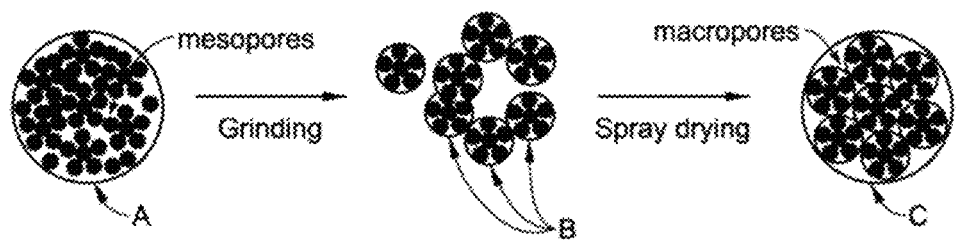
FIG. 1 is a schematic illustrating various support particle structures.

Molecular weight distribution ("MWD"), also referred to as polydispersity (PDI), is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

the number average molecular weight is given by $$M_n = \frac{\sum_i n_i M_i}{\sum_i n_i}$$

the z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. For purposes herein "mean" refers to the statistical mean or average, i.e., the sum of a series of observations or statistical data divided by the number of observations in the series, and the terms mean and average are used interchangeably; "median" refers to the middle value in a series of observed values or statistical data arranged in increasing or decreasing order, i.e., if the number of observations is odd, the middle value, or if the number of observations is even, the arithmetic mean of the two middle values.

For purposes herein, the mode, also called peak value or maxima, refers to the value or item occurring most frequently in a series of observations or statistical data, i.e., the inflection point. An inflection point is that point where the second derivative of the curve changes in sign.

For purposes herein, a multimodal distribution is one having two or more peaks, i.e., a distribution having a plurality of local maxima; a bimodal distribution has two inflection points; and a unimodal distribution has one peak or inflection point.

For purposes herein, particle size (PS) or diameter of particles, such as catalyst support particles (e.g., silica particles), and distributions thereof, are determined by laser diffraction using a LS 13 320 particle size analyzer equipped with a micro liquid module (range 0.017-2000 μm) available from Beckman Coulter, Inc., headquarters in Indianapolis, Ind., US. Average PS refers to the distribution of particle volume with respect to particle size. Unless otherwise indicated expressly or by context, "particle" refers to the overall particle body or assembly such as an aggregate, agglomerate or encapsulated agglomerate or a "main particle," rather than subunits or parts of the body such as the "primary particles" or "sub-particles".

For purposes herein, the surface area (SA, also called the specific surface area or BET surface area), pore volume (PV), and mean or average pore diameter (PD) of catalyst support materials are determined by the Brunauer-Emmett-Teller (BET) method using adsorption-desorption of nitrogen (temperature of liquid nitrogen: 77 K) with a MICROMERITICS ASAP 2420 instrument after degassing of the powders for 4 hours at 350° C. for raw or calcined silica or 60° C. for the silica supported activator (e.g., methylaluminoxane or MAO) or the derived finished catalysts. More information regarding the method can be found, for example, in Lowell, S. et al. (2004) "*Characterization of Porous Solids and Powders: Surface Area, Pore Size and Density*", Springer. PV refers to the total PV, including both internal and external PV. Mean PD refers to the distribution of total PV with respect to PD.

Melt Flow Rate (MFR) was measured as per ASTM D1238, condition L, at 230° C. and 2.16 kg load unless otherwise indicated.

The 1% secant flexural modulus (1% SFM) was measured using a ISO 37-Type 3 bar, with a crosshead speed of 1.0 mm/min and a support span of 30.0 mm using an Instron machine according to ASTM D 790 (A, 1.0 mm/min) unless otherwise indicated.

Catalyst support particles (e.g., silica support parts) can be in regular form or sub-particle form. For purpose herein, "regular form" refers to support particles (e.g., silica) having a main particle structure, wherein the main particle is formed by the agglomeration or aggregation of primary particles. The term "main particle" as used herein refers to the agglomerates or aggregates of primary particles that are separated from each other, i.e., there is neither chemical bonding nor physical binding among main particles. The main particle sizes can be measured with a particle size analyzer such as the Beckman Coulter LS 13 320 laser diffraction instrument to obtain the average particle size and particle size distribution information. For example, they can be held together by certain adhesion through either chemical bonding or the physical binding, i.e., characterized by weak interactions such that the main particles can become fragmented by mechanical forces, e.g., particles joined together mainly at corners or edges. The term "primary particle" refers to the smallest particle unit (i.e., without fragmenting into smaller particles during polymerization) used for the construction of main particles. For amorphous silica (or silica gel), the primary particles can be non-porous materials, e.g., fumed silica, or can contain only micropores, e.g., in nanometer scale, where catalyst or co-catalyst molecules may not enter. Therefore, the catalytic species may only be attached on the surface of a primary particle and not in the primary particle's pores. As such, no polymer expansion fragmentation can occur; thus, the primary particle may not be fragmentable. During the polymerization process, a main particle can fragment to become support debris (e.g., silica debris) with the polymer chains growing between debris to hold the debris together to form a polymer granule and the polymer granules may replicate the main particle structure in certain instances, e.g., replicating a high surface area silica to become highly porous polymer granules.

For purpose herein, the term "sub-particle" refers to support particles (e.g., silica) having a structure defined by sub-units of a main particle. A plurality of sub-particles may form an agglomeration (or aggregation) of sub-particles. For example, as depicted in FIG. 1, Particle A represents a main particle consisting of primary particles (as solid dots). Particles B represents sub-particles, which are main particle sub-units (sub-units of Particle A), for example, formed by applying a physical force, such as grinding, to Particle A (main particle). Particle C represents an agglomeration (or aggregation) of sub-particles (Particles B), for example, formed by the re-aggregation (e.g., spray drying) of the sub-particles. As used herein, "spray dried" refers to metal oxide such as silica obtained by expanding a sol in such a manner as to evaporate the liquid from the sol, e.g., by passing the silica sol through a jet or nozzle with a hot gas. A main particle may typically have an overall size range of 1-300 μm (e.g., 30 to 200 μm), a sub-particle may typically have a size range of 0.01-20 μm (e.g., 0.05 to 0.60 μm or 1-20 μm), and a primary particle may typically have a size range of 5 to 50 nm (e.g., 10 to 40 nm).

As shown in FIG. 1, the gaps between primary particles in the main particle (Particle A), may be mesopores, and the gaps between sub-particles in the agglomeration (or aggregation) of sub-particles (Particle C) may be macropores. Since polymer growth can replicates the catalyst support structure (Pasquini, N. (Ed.), *Polypropylene Handbook, 2nd Edition*, Hanser Publisher, Munich (2005)), when using silica as the support, the polymer granule structure should replicate the silica porosity, i.e., the more porous the silica, the more porous the polymer granules; and the larger the silica pore diameter should generate larger pores in the polymer granules. There are three types of pores for porous materials based on IUPAC notation (Rouquerol et al. (1994) *Pure and Applied Chem.*, 8, 66): micropore (less than 2 nm), mesopore (2-50 nm), and macropore (greater than 50 nm). Micropores (pores in primary particles) may or may not be present in particles used as primary particles to construct main particles, e.g., non-porous fumed silica or nano size micro-pore containing silica; mesopores may be present in regular form support particles (e.g., regular silica) or sub-particle form support particles (e.g., sub-particle form silica), for example, as gaps between primary particles; and macropores may be present in agglomeration (or aggregation) of sub-particles between sub-particles (e.g., sub-particle containing silica), for example, as gaps between sub-units of main particles. Depending on the preparation method, macro-pores can be present in regular silica as well although usually sub-particle form silica contains significantly higher macro-pore contents, e.g., higher macro-pore volume. The non-fragmentable nature of a primary particle, e.g., the fumed silica or micro-pore containing silica, should therefore become understandable since the micropore size is comparable to or smaller than the catalyst component molecules, e.g., activators such as the polymeric MAO molecule, that cannot fill in pores less than 5 nm and can only bind to the surface of a fumed silica particle or a micro-pore containing silica particle that has pores less than 2 nm. Thus, fumed silica or micro-pore containing silica is the smallest non-fragmentable unit since no active catalyst can form inside the fumed silica or micro-pore containing silica and therefore no polymerization can occur to cause the expansion fragmentation.

Fragmentation of a particle can occur by the external application of many kinds of physical forces. For example, mechanical force from crushing under such as high heat such as during calcination of support particles, and/or the presence of mechanical forces from crushing under compression or from the impact of moving particles into contact with other particles and/or onto fixed surfaces, sometimes referred to as "agitation fragmentation". Fragmentation can also result in any embodiment herein from the insertion, expansion and/or other interaction of materials in connection with pores of the particles, such as, for example, when MAO is inserted or polymer is formed in the pores, and subunits of the support particle are broken off or the support particle otherwise expands to force subunits of the particle away from other subunits, e.g., causing a capsule to break open, forcing primary particles away from each other, such as may occur during polymerization or during a heat treatment for catalyst preparation or activation. This latter type of fragmentation is referred to herein as "expansion fragmentation" and/or "expansion disagglomeration" in the case of disagglomerating particles from an agglomerate, including micro-encapsulated agglomerates. Some types of fragmentation above, e.g., the "agitation fragmentation" and catalyst preparation related chemical expansion such as "MAO expansion fragmentation" are undesired and should be limited or eliminated because they oftentimes cause poor morphology of the resulting granules and even a reactor fouling, such as the fines related fouling. However, the expansion fragmentation of the main particles of a catalyst support during the polymerization is desired because of such the catalyst debris can be distributed on the growing polymer granules for better activity, better morphology, and better removal of heat generated by the polymerization reaction, and so on. Non-fragmentable main particles, such as the highly crystalline zeolites, are not suitable to use as the polyolefin catalyst supports because if the particles are non-fragmentable, the active catalyst in the particle will be wrapped inside the granule due to the growing polymer and can quickly loss the activity since monomers are becoming more and more difficult to reach the catalyst. Furthermore, more evenly distributed catalyst debris over the growing polymer granules are highly desired because of such the large hollow spots in a granule can be limited to obtain better granule morphology, e.g., better bulk density and flowability, for the granules to have similar flowing behaviors in a gas phase reactor to ensure a smooth polymerization control. Sub-particle form support particles (e.g., sub-particle containing silica) is therefore more desired for such a purpose since their fragmentation results in more evenly distributed catalyst debris.

For purposes of this specification and the claims appended thereto, when referring to polymerizing in the presence of at least X mmol hydrogen or other chain transfer or termination agent ("CTA") per mole of propylene, the ratio is determined based upon the amounts of hydrogen or other chain transfer agent and propylene fed into the reactor. A "chain transfer agent" is hydrogen or an agent capable of hydrocarbyl and/or polymeryl group exchange between a coordinative polymerization catalyst and a metal center of the CTA during polymerization.

Unless otherwise indicated, "conversion" is the amount of monomer that is converted to polymer product, and is reported as mol % and is calculated based on the polymer yield and the amount of monomer fed into the reactor.

Unless otherwise indicated, "catalyst activity" is a measure of how active the catalyst is and is reported as the mass of product polymer (P) produced per mole of catalyst (cat) transition metal used (kg P/mol cat).

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

An "ethylene polymer" or "polyethylene" or "ethylene copolymer" is a polymer or copolymer comprising at least 50 mol % ethylene derived units; a "propylene polymer" or "polypropylene" or "propylene copolymer" is a polymer or copolymer comprising at least 50 mol % propylene derived units; and so on. The term "polypropylene" is meant to encompass isotactic polypropylene (iPP), defined as having at least 10% or more isotactic pentads, highly isotactic polypropylene, defined as having 50% or more isotactic pentads, syndiotactic polypropylene (sPP), defined as having at 10% or more syndiotactic pentads, homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene ($C_2$) and $C_4$ to $C_8$ 1-olefins. Preferably isotactic polymers (such as iPP) have at least 20% (preferably at least 30%, preferably at least 40%) isotactic pentads. A polyolefin is "atactic", also referred to as "amorphous" if it has less than 10% isotactic pentads and syndiotactic pentads.

For purposes herein, porosity of the matrix phase polymer particles refers to the volume fraction or percentage of PV within a particle or body comprising a skeleton or matrix of the propylene polymer, on the basis of the overall volume of the particle or body with respect to total volume. The porosity and median PD of polymer particles are determined using mercury intrusion porosimetry. Mercury intrusion porosimetry involves placing the sample in a penetrometer and surrounding the sample with mercury. Mercury is a non-wetting liquid to most materials and resists entering voids, doing so only when pressure is applied. The pressure at which mercury enters a pore is inversely proportional to the size of the opening to the void. As mercury is forced to enter pores within the sample material, it is depleted from a capillary stem reservoir connected to the sample cup. The incremental volume depleted after each pressure change is determined by measuring the change in capacity of the stem. This intrusion volume is recorded with the corresponding pressure. Unless otherwise specified, all porosimetry data are obtained using MICROMERITICS ANALYTICAL SERVICES and/or the AUTOPORE IV 9500 mercury porosimeter.

The term heterophasic" refers to the presence of two or more morphological phases in a composition comprising two or more polymers, where each phase comprises a different polymer or a different ratio of the polymers as a result of partial or complete immiscibility (i.e., thermodynamic incompatibility). A common example is a morphology consisting of a matrix phase, also referred to as a continuous phase or stiff phase, and at least one fill phase, also referred to as a dispersed phase, a discontinuous phase or a rubber phase. The fill phase takes the form of discrete domains (particles) distributed within the matrix (or within other phase domains, if there are more than two phases). As used herein, "domain" refers to the discontinuous (or isolated) regions or phases formed in a continuous matrix phase, wherein the majority of the isolated phases or regions can display a clean or defined border with a continuous matrix phase, for example, as shown in an SEM image (FIGS. 10a, 10b, 11a, 11b). The domain size can be measured with an analytical method such as the granular cross-section $RuO_4$ dyed SEM as described in further detail below. The domain size may be smaller than the granule size of the copolymer. When the cross-section SEM is used to measure the domain size, the result may not represent the real domain shape in some instances because the plastomer domain may be soft even under extremely low temperature for cross-section and the domain shape may deform and losses the original shape, e.g., the domain shape can be elongated. Another example is a co-continuous morphology, where two phases are observed but it is unclear which one is the continuous phase, and which is the discontinuous phase, e.g., where a matrix phase has generally continuous internal pores and a fill phase is deposited within the pores, or where the fill phase expands within the pores of an initially globular matrix phase to expand the porous matrix globules, corresponding to the polymer initially formed on or in the support agglomerates, into subglobules which may be partially or wholly separated and/or co-continuous or dispersed within the fill phase, corresponding to the polymer formed on or in the primary particles of the support. For example, a polymer globule may initially have a matrix phase with a porosity corresponding to the support agglomerates, but a higher fill phase due to expansion of the fill phase in interstices between subglobules of the matrix phase.

The matrix phase of a porous, particulated material in which the pores are formed is inclusive of nonpolymeric and/or inorganic inclusion material within the matrix, e.g., catalyst system materials including support material, active catalyst system particles, catalyst system residue particles, or a combination thereof. As used herein, "total volume" of a matrix refers to the volume occupied by the particles comprising the matrix phase, i.e., excluding interstitial spaces between particles but inclusive of interior pore volumes or internal porosity within the particles. "Internal" or "interior" pore surfaces or volumes refer to pore surfaces and/or volumes defined by the surfaces inside the particle which cannot be contacted by other similar particles, as opposed to external surfaces which are surfaces capable of contacting another similar particle. Where the propylene polymer is wholly or partially filled, e.g., in the context of the pores containing a fill rubber or fill material other than the propylene polymer, the porosity also refers to the fraction of the void spaces or pores within the particle or body regardless of whether the void spaces or pores are filled or unfilled, i.e., the porosity of the particle or body is calculated by including the volume of the fill material as void space as if the fill material were not present.

The term "sequential polymerization" refers to a polymerization process wherein different polymers are produced at different periods of time in the same or different reactors, e.g., to produce a heterophasic polymer. The terms "gas phase polymerization," "slurry phase polymerization," "homogeneous polymerization process," and "bulk polymerization process" are defined below.

The term "continuous" means a system that operates without interruption or cessation. For example, a continuous process to produce a polymer would be one where the reactants are continually introduced into one or more reactors and polymer product is continually withdrawn.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate.

Room temperature (RT), is 23° C.±3° C. unless otherwise indicated.

A "catalyst system" is a combination of at least one catalyst precursor compound, at least one activator, an optional co-activator, and a support material. A polymerization catalyst system is a catalyst system that can polymerize monomers to polymer. For the purposes of this invention and the claims thereto, when catalyst systems are described as comprising neutral stable forms of the components, it is well understood by one of ordinary skill in the art that the ionic form of the component is the form that reacts with the monomers to produce polymers.

In the description herein, the single-site catalyst precursor compound may be described as a catalyst precursor, a catalyst precursor compound, a pre-catalyst compound, metallocene or MCN, metallocene compound, metallocene catalyst, metallocene catalyst compound, metallocene catalyst precursor compound or a transition metal compound, or similar variation, and these terms are used interchangeably.

A "metallocene catalyst" is defined as an organometallic compound cyclopentadienyl ligand (or substituted cyclopentadienyl moiety) or ligand isolobal to cyclopentadienyl and more frequently two cyclopentadienyl ligands or substituted cyclopentadienyl ligands. Indene, substituted indene, fluorene and substituted fluorene are all substituted cyclopentadienyl moieties.

An "organometallic compound" is defined as a compound containing at least one bond between a carbon atom of an organic compound and a metal, and is typically, although not always, capable of deprotonating hydroxyl groups, e.g., from a support material. A deprotonating agent is defined as a compound or system capable of deprotonating hydroxyl groups from the support, and may be an organometallic or another compound such as a metal amide, e.g., aluminum amide or lithium amide.

The terms "hydrocarbyl radical", "hydrocarbyl" and "hydrocarbyl group" are used interchangeably throughout this document. Likewise, the terms "group", "radical", and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic. A substituted hydrocarbyl radical is a hydrocarbyl radical where at least one hydrogen has been replaced by a heteroatom or heteroatom containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Functional groups may also be taken broadly to include organic polymer supports or inorganic support material, such as alumina, and silica. Preferred examples of polar groups include $NR*_2$, $OR*$, $SeR*$, $TeR*$, $PR*_2$, $AsR*_2$, $SbR*_2$, $SR*$, $BR*_2$, $SnR*_3$, $PbR*_3$ and the like, where $R*$ is independently a hydrocarbyl, substituted hydrocarbyl, halocarbyl or substituted halocarbyl radical as defined above and two $R*$ may join together to form a substituted or unsubstituted saturated, partially unsaturated or aromatic cyclic or polycyclic ring structure. Also useful are sulfonate radicals, $S(=O)_2OR*$, where $R*$ is defined as above. Examples include $SO_3Me$ (mesylate), $SO_3$(4-tosyl) (tosylate), $SO_3CF_3$ (triflate), $SO_3(n-C_4F_9)$ (nonaflate), and the like.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl", or "substituted indenyl", or "substituted aryl", the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

II. Heterophasic Copolymers

Heterophasic copolymers comprising a matrix phase comprising propylene derived units (propylene polymers) and a fill phase comprising propylene derived units and α-olefins such as ethylene, 1-butene, and/or 1-hexene derived units (EP plastomer) are provided herein. In various aspects, a heterophasic copolymer having high amounts of the fill phase may be achieved without the use of a solvent, for example, via a gas phase polymerization process, as further described below.

A. Matrix Phase

The matrix phase may comprise a propylene homopolymer, propylene copolymer, an ethylene homopolymer or an ethylene copolymer. As described herein, the terms "propylene homopolymer" and "homopolypropylene" are interchangeable. The polypropylene used in the blends described herein may vary widely in form. For example, a substantially isotactic polypropylene homopolymer can be used or the polypropylene can be in the form of a random copolymer. Further, the polypropylene can be present in the form of a graft or block copolymer, in which the blocks of polypropylene have substantially the same stereoregularity as the propylene-alpha-olefin copolymer, so long as the graft or block copolymer has a sharp melting point characteristic of the stereoregular propylene sequences that is above 100° C. in any embodiment, and above 110° C. in another embodiment and, in still another embodiment, above 125° C. The propylene polymer component may be a combination of homopolypropylene, and/or random, and/or block copolymers as described herein.

In various aspects, the matrix phase may comprise propylene-derived units in an amount of at least 90 mol %, at least 95 mol %, 100 mol % or from 90 to 100 mol % or 95 to 100 mol % based on the total molar number of the monomer units in the matrix phase. Preferably, the matrix phase may comprise propylene-derived units in an amount of at least 95 mol % or from 95 to 100 mol % when the above propylene polymer component is a random copolymer, the amount of a copolymerized alpha-olefin in the copolymer may be up to 10 mol %, up to 8 mol %, up to 5 mol %, up to 2 mol %, or from 2-10 mol %, 2-8 mol % or 2-5 mol % based on the total molar number of the monomer units in the matrix phase. The preferred alpha-olefins contain 2 or from 4 to 12 carbon atoms. The most preferred alpha-olefin is ethylene. One, or two or more alpha-olefins can be copolymerized with propylene. Exemplary alpha-olefins may be selected from the group consisting of C4 to $C_{12}$ olefins such as butene-1; pentene-1,2-methylpentene-1,3-methylbutene-1,hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methyl ethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1 and hexadodecene-1.

In any embodiment, the matrix phase may comprise 90 to 100 mol % propylene-derived units and 0 to 10 mol % ethylene-derived units or 95 to 100 mol % propylene-derived units and 0 to 5 mol % ethylene-derived units.

In various aspects, the matrix phase may comprise ethylene-derived units in an amount of at least 90 mol %, at least 95 mol %, 100 mol % or from 90 to 100 mol % or 95 to 100 mol % based on the total molar number of the monomer units in the matrix phase. Preferably, the matrix phase may comprise ethylene-derived units in an amount of at least 95 mol % or from 95 to 100 mol % when the above ethylene polymer component is a copolymer, the amount of a copolymerized alpha-olefin in the copolymer may be up to 10 mol %, up to 8 mol %, up to 5 mol %, up to 2 mol %, or from 2-10 mol %, 2-8 mol % or 2-5 mol % based on the total molar number of the monomer units in the matrix phase. The preferred alpha-olefins contain 2 or from 4 to 12 carbon atoms. The most preferred alpha-olefin is propylene. One, or two or more alpha-olefins can be copolymerized with ethylene. Exemplary alpha-olefins may be selected from the group consisting of $C_4$ to $C_{12}$ olefins as listed above.

In any embodiment, the matrix phase may comprise 90 to 100 mol % ethylene-derived units and 0 to 10 mol % propylene units or 95 to 100 mol % ethylene-derived units and 0 to 5 mol % propylene-derived units.

The matrix phase may be predominately crystalline, i.e., it has a melting point generally greater than 100° C., greater than 110° C., or greater than 125° C. Advantageously, the matrix phase may have a sponge-like structure comprising walls. The walls may be stiff and define pores therein for the fill phase to occupy. In any embodiment, the walls may have an average thickness of less than or equal to 3 μm, less than or equal to 2.5 μm, less than or equal to 2 μm, less than or equal to 1.5 μm, less than or equal to 1 μm, less than or equal to 0.8 µm, less than or equal to 0.5 µm, less than or equal to 0.3 µm, 0.2 µm, or from 0.2-3 µm, 0.3 to 2.5 µm, 0.5 to 1.5 µm, or 0.5 to 1 µm. In any embodiment, the wall thickness may be substantially uniform or in other embodiments, the wall thickness may be have some variation and be non-uniform.

Preferably, the homopolypropylene has a melt flow rate (MFR) (ASTM D 1238, 230° C., 2.16 kg) in the range from 0.1 dg/min to 500 dg/min, or from 0.5 dg/min to 200 dg/min, or from 0.5 dg/min to 100 dg/min, or from 1 dg/min to 50 dg/min, or from and from 1.5 dg/min to 20 dg/min, or from 2 dg/min to 10 dg/min. Preferably, the propylene has a 1% secant flexural modulus ranging from 100 MPa to 2300 MPa, preferably 300 MPa to 2100 MPa, and more preferably from 500 MPa to 2000 MPa. Preferably, the homopolypropylene has a molecular weight distribution (Mw/Mn) of up to 40, preferably ranging from 1.5 to 10, or from 1.8 to 7, or from 1.9 to 5, or from 2.0 to 4.

The propylene polymers useful herein may have some level of isotacticity. Thus, in any embodiment, the propylene polymer may be a homopolypropylene comprising isotactic polypropylene (iPP). As used herein, "isotactic" is defined as having at least 60% isotactic pentads according to analysis by $^{13}$C-NMR. Alternatively, the propylene homopolymer may include atactic sequences or syndiotactic sequences. For example, a suitable propylene homopolymer can have at least 85% syndiotacticity, and alternatively at least 90% syndiotacticity. As used herein, "syndiotactic" is defined as having at least 60% syndiotactic pentads according to analysis by $^{13}$C-NMR. Atactic homopolypropylene is defined to be less than 10% isotactic or syndiotactic pentads. Preferably, homopolypropylene has at least 85% isotacticity, more preferably at least 90% isotacticity. Suitable isotactic polypropylene has a melt temperature ($T_m$) ranging from a low of 130° C., or 140° C., 150° C., or 160° C. to a high of 160° C., 170° C., or 175° C., preferably from 150° C. to 170° C. The crystallization temperature ($T_c$) of the isotactic polypropylene preferably ranges from a low of 95° C., 100° C., or 105° C. to a high of 110° C., 120° C. or 130° C., such as 100° C. to 120° C. Furthermore, the isotactic polypropylene preferably has a crystallinity of at least 25%. Generally, the isotactic polypropylene has a melt flow rate of less than 10 dg/min, often less than 5 dg/min, and often less than 3 dg/min. Often the isotactic polypropylene has a melt flow rate ranging from 2 dg/min to 5 dg/min. A preferred isotactic polypropylene has a heat of fusion of greater than 75 J/g, or greater than 80 J/g, or greater than 90 J/g to a high of 150 J/g, such as from 80 J/g to 120 J/g. In any embodiment, the isotactic polypropylene may have a density of from 0.85 g/cm$^3$ to 0.93 g/cm$^3$. Preferably, the isotactic polypropylene has a density of from 0.88 g/cm$^3$ to 0.92 g/cm$^3$, more preferably from 0.90 g/cm$^3$ to 0.91 g/cm$^3$.

An illustrative isotactic polypropylene has a weight average molecular weight (Mw) from 200,000 g/mole to 600,000 g/mole, and a number average molecular weight (Mn) from 80,000 g/mole to 200,000 g/mole. A more preferable isotactic polypropylene has an Mw from 300,000 g/mole to 500,000 g/mole, and a Mn from 90,000 g/mole to 150,000 g/mole. In any embodiment, the isotactic polypropylene may have an Mw/Mn value within a range having a low of 1.5, 1.8, or 2.0 and a high of 4.5, 5, 10, 20, or 40, preferably from 1.5 to 10.

In any embodiment, the propylene homopolymer has one or more of the following properties: a melt flow rate MFR in the range of from 1.5 dg/min to 20 dg/min, as determined by ASTM D 1238, 230° C., 2.16 kg; a molecular weight distribution Mw/Mn ranging from 1.9 to 5, as determined by GPC; a 1% secant flexural modulus ranging from 500 MPa to 2000 MPa.

B. Fill Phase

The fill phase may be present as domains at least partially filling pores in the matrix phase. The domains may have an average area of, as measured as described below in the Examples, greater than or equal to 0.5 µm$^2$, greater than or equal to 1 µm$^2$, greater than or equal to 5 µm$^2$, greater than or equal to 10 µm$^2$, greater than or equal to 15 µm$^2$, greater than or equal to 20 µm$^2$, greater than or equal to 25 µm$^2$, greater than or equal to 30 µm$^2$, or in a range of 0.5 to 30 µm$^2$, 0.5 to 20 µm$^2$, or 1 to 15 µm$^2$. In any embodiment, the total area of the domains may be at least 30%, at least 40%, at least 50%, at least 60% or at least 70% of the total area of the heterophasic copolymer, or the total area of the domains may be in a range of 30 to 70%, 40 to 70% or 50 to 70% of the total area of the heterophasic copolymer.

In any embodiment, the fill phase may comprise a semi-crystalline plastomer, which may be propylene-based or ethylene-based for example, a random copolymer comprising propylene-derived units and ethylene or $C_4$ to $C_{10}$ α-olefin-derived units or a random copolymer comprising ethylene-derived units and $C_3$ to $C_{10}$ α-olefin-derived units. The fill phase may have crystalline regions interrupted by non-crystalline regions. The non-crystalline regions may result from regions of non-crystallizable polypropylene segments and/or the inclusion of comonomer units. The crystallinity and the melting point of the fill phase are reduced compared to highly isotactic polypropylene by the introduction of errors (stereo and region defects) in the insertion of propylene and/or by the presence of comonomer. In any embodiment, fill phase may comprise a propylene-based elastomer having limited crystallinity due to adjacent isotactic propylene units and a melting point as described herein. In other embodiments, the propylene-based plastomer is generally devoid of any substantial intermolecular heterogeneity in tacticity and comonomer composition, and also generally devoid of any substantial heterogeneity in intramolecular composition distribution.

In any embodiment, the fill phase comprises propylene-derived units in an amount of at least 50 mol %, at least 60 mol %, at least 75 mol %, at least 80 mol %, at least 90 mol %, 95 mol % or in a range of 50 to 95 mol %, 60 to 95 mol %, 70 to 95 mol %, 75 to 95 mol % or 80 to 90 mol % based on the total molar number of the monomer units in the fill phase. Correspondingly, the units, or comonomers, derived from at least one of ethylene or a $C_4$ to $C_{10}$ α-olefin may be present in an amount of at least 5 mol %, at least 10 mol %, at least 20 mol %, at least 30 mol %, at least 40 mol % or 50 mol %, or in a range of 5 to 50 mol %, 5 to 40 mol %, 5 to 30 mol % or 10 to 20 mol % based on total molar number of the monomer units in the fill phase. In preferred embodiments, the comonomer is ethylene, 1-hexene, or 1-octene. In any embodiment, the fill phase comprises 60 to 95 mol % propylene-derived units and 5 to 40 mol % ethylene-derived units based on total molar number of the monomer units in the fill phase.

In any embodiment, the fill phase comprises ethylene-derived units in an amount of at least 50 mol %, at least 60 mol %, at least 75 mol %, at least 80 mol %, at least 90 mol %, 95 mol % or in a range of 50 to 95 mol %, 60 to 95 mol %, 70 to 95 mol %, 75 to 95 mol % or 80 to 90 mol % based on the total molar number of the monomer units in the fill phase. Correspondingly, the units, or comonomers, derived from at least one of propylene or a $C_4$ to $C_{10}$ α-olefin may be present in an amount of at least 5 mol %, at least 10 mol %, at least 20 mol %, at least 30 mol %, at least 40 mol % or 50 mol %, or in a range of 5 to 50 mol %, 5 to 40 mol %, 5 to 30 mol % or 10 to 20 mol % based on total molar number of the monomer units in the fill phase. In preferred embodiments, the comonomer is propylene, 1-hexene, or 1-octene. In any embodiment, the fill phase comprises 60 to 95 mol % ethylene-derived units and 5 to 40 mol % propylene-derived units based on total molar number of the monomer units in the fill phase.

In any embodiment, the fill phase may consists essentially of units derived from propylene and ethylene, i.e., the fill phase does not contain any other comonomer in an amount typically present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

The fill phase may comprise more than one comonomer. Preferred embodiments of a fill phase having more than one comonomer including propylene-ethylene-octene, propylene-ethylene-hexene, and propylene-ethylene-butene copolymers. In embodiments where more than one comonomers derived from at least one of ethylene or a $C_4$ to $C_{10}$ α-olefins are present, the amount of each comonomer may be less than 5 wt % of the fill phase, but the combined amount of comonomers by weight of the fill phase is 5 wt % or greater.

In any embodiment, the propylene-based plastomer or the ethylene-based plastomer consists essentially of units derived from propylene and ethylene, i.e., the propylene-based plastomer or the ethylene-based plastomer does not contain any other comonomer in an amount typically present as impurities in the ethylene and/or propylene feedstreams used during polymerization or an amount that would materially affect the heat of fusion, melting point, crystallinity, or melt flow rate of the propylene-based elastomer, or any other comonomer intentionally added to the polymerization process.

The fill phase may be characterized as "semi-crystalline," which may be expressed as a percent crystallinity, as determined according to the DSC procedure described herein. As used herein, "semi-crystalline" refers to a fill phase having a lower crystallinity, for example a crystallinity of less than or equal to 20%, but still having at least some degree of crystallinity, for example, a crystallinity of greater than 0%. In other words, the term "semi-crystalline" excludes amorphous rubber, which has a crystallinity of 0% or close to 0%. In any embodiment, a semi-crystalline fill phase may have a percent crystallinity, as determined according to many analytical methods, such as X-ray, NMR, IR, density measurement, calorimetry, etc. including the DSC procedure described herein (Becker, G. W. et al. (1998) *Engineering Thermoplastics. Polyamides.* (in German) Hanser Verlag), of 0.5% to 20%, 1% to 20%, 5% to 20%, or 5% to 15% of crystallizable isotactic propylene units for polypropylene based heterophasic copolymers or crystallizable ethylene units for polyethylene based heterophasic copolymers. The highest heat of fusion of homo-polypropylene (i.e., 100% crystallinity) is estimated at 189-207 J/g. and the highest heat of fusion of homo-polyethylene (i.e., 100% crystallinity) is estimated at 286-293 j/g. The "semi-crystallinity" of the fill phase may also be expressed as a percent comonomer content, as determined according to the C13-NMR and/or GPC-4D procedures described herein (in event of conflict the GPC-4D shall be used), i.e., the fill phase has a monomer to comonomer ratio in the range of 60:40 to 95:5 (mol:mol), for example, for propylene based fill phase, from a 60:40 to 95:5 propylene to ethylene ratio; or for ethylene based fill phase, from 60:40 to 95:5 ethylene:$C_4$-$C_{10}$ comonomer ratio. In other words, the term "semi-crystalline" excludes amorphous or close to amorphous rubber from a near 50:50 (mol:mol) ratio of monomer to comonomer, e.g., for propylene based fill phase, from 50:50 to 59:41 propylene:ethylene ratio; or for ethylene based fill phase, from 50:50-59:41 ethylene: $C_4$-$C_{10}$ comonomer ratio.

In any embodiment, the propylene-derived units of the fill phase may have an isotactic triad fraction of 50% to 99%, more preferably 65% to 97% and more preferably 75% to 97%. In other embodiments, the propylene-derived units of the fill phase has a triad tacticity as measured by $^{13}$C NMR, of 75% or greater, 80% or greater, 82% or greater, 85% or greater, or 90% or greater. The triad tacticity of a polymer is the relative tacticity of a sequence of three adjacent propylene units, a chain consisting of head to tail bonds, expressed as a binary combination of m and r sequences. It is usually expressed as the ratio of the number of units of the specified tacticity to all of the propylene triads in the first polymer. The triad tacticity (mm fraction) of a propylene copolymer can be determined from a $^{13}$C NMR spectrum of the propylene copolymer. The calculation of the triad tacticity is described in the U.S. Pat. No. 5,504,172, the entire contents of which are incorporated herein by reference.

The fill phase may have a single peak melting transition as determined by DSC. In any embodiment, the fill phase has a primary peak transition of 90° C. or less, with a broad end-of-melt transition of 110° C. or greater. The peak "melting point" ("$T_m$") is defined as the temperature of the greatest heat absorption within the range of melting of the sample. However, the fill phase may show secondary melting peaks adjacent to the principal peak, and/or at the end-of-melt transition. For the purposes of this disclosure, such secondary melting peaks are considered together as a single melting point, with the highest of these peaks being considered the $T_m$ of the EP plastomer. The fill phase may have a $T_m$ of 100° C. or less, 90° C. or less, 80° C. or less, 70° C. or less, 60° C. or less, or 50° C. or less. In any embodiment, the fill phase may have a $T_m$ of 25° C. to 100° C., 25° C. to 85° C., 25° C. to 75° C., or 25° C. to 65° C. In any embodiment, the fill phase may have a $T_m$ of 30° C. to 80° C., preferably 30° C. to 70° C.

For the thermal properties of the fill phase, Differential Scanning calorimetry ("DSC") was used. Such DSC data was obtained using a Perkin-Elmer DSC 7.5 mg to 10 mg of a sheet of the polymer to be tested was pressed at approximately 200° C. to 230° C., then removed with a punch die and annealed at 23° C. for 48 hours. The samples were then sealed in aluminum sample pans. The DSC data was recorded by first cooling the sample to −50° C. and then gradually heating it to 200° C. at a rate of 10° C./minute. The sample was kept at 200° C. for 5 minutes before a second cooling-heating cycle was applied. Both the first and second cycle thermal events were recorded. Areas under the melting curves were measured and used to determine the heat of fusion and the degree of crystallinity. The percent crystallinity (X %) was calculated using the formula, X %=[area under the curve (Joules/gram)/B(Joules/gram)]*100, where B is the heat of fusion for the homopolymer of the major monomer component. These values for B were found from the Polymer Handbook, Fourth Edition, published by John Wiley and Sons, New York 1999. A value of 189 J/g (B) was used as the heat of fusion for 100% crystalline polypropylene. The melting temperature was measured and reported during the second heating cycle (or second melt).

The fill phase may have a density of 0.850 g/cm³ to 0.920 g/cm³, 0.860 g/cm³ to 0.900 g/cm³, preferably 0.860 g/cm³ to 0.890 g/cm³, at room temperature (23° C.) as measured per ASTM D-1505.

The fill phase preferably has a melt flow rate ("MFR") greater than 0.5 g/10 min, and less than or equal to 1,000 g/10 min, or less than or equal to 800 g/10 min, more preferably less than or equal to 500 g/10 min, more preferably less than or equal to 200 g/10 min, more preferably less than or equal to 100 g/10 min, more preferably less than or equal to 50 g/10 min. Particularly preferred embodiments include fill phase with an MFR of less than or equal to 25 g/10 min, such as from 1 to 25 g/10 min, more preferably 1 to 20 g/10 min. The MFR is determined according to ASTM D-1238, condition L (2.16 kg, 230° C.).

The fill phase may have a weight average molecular weight ("Mw") of 5,000 to 5,000,000 g/mole, preferably 10,000 to 1,000,000 g/mole, and more preferably 50,000 to 400,000 g/mole; a number average molecular weight ("Mn") of 2,500 to 2,500,00 g/mole, preferably 10,000 to 250,000 g/mole, and more preferably 25,000 to 200,000 g/mole; and/or a z-average molecular weight ("Mz") of 10,000 to 7,000,000 g/mole, preferably 80,000 to 700,000 g/mole, and more preferably 100,000 to 500,000 g/mole. The fill phase may have a molecular weight distribution (Mw/Mn, or "MWD") of 1.5 to 40, 1.5 to 20, or 1.5 to 15, preferably 1.5 to 5, and more preferably 1.8 to 5, and most preferably 1.8 to 4.

The fill phase may have an Elongation at Break of less than 2,000%, less than 1,000%, or less than 800%, as measured per ASTM D412.

The crystallinity of the fill phase may also be expressed in terms of heat of fusion. In certain embodiments, the fill phase has a heat of fusion, as determined by DSC, less than or equal to 85 J/g, less than or equal to 75 J/g, less than or equal to 70 J/g, less than or equal to 60 J/g, less than or equal to 50 J/g, less than or equal to 40 J/g, less than or equal to 30 J/g, less than or equal to 20 J/g, less than or equal to 10 J/g, less than or equal to 5 J/g, or 1 J/g. In any embodiment, the fill phase has a heat of fusion, as determined by DSC, ranging from a lower limit of 1.0 J/g, or 1.5 J/g, or 3.0 J/g, or 4.0 J/g, or 5.0 J/g, or 6.0 J/g, or 7.0 J/g, to an upper limit of 30 J/g, or 40 J/g, or 50 J/g, or 60 J/g, or 80 J/g, or 85 J/g, for example, 5 to 85 J/g or 5 to 60 J/g. Without being bound by theory, it is believed that the fill phase may have generally isotactic crystallizable propylene sequences, and the heats of fusion described above are thought to result from melting of these crystalline segments. In any embodiment, the level of crystallinity of the fill phase may also be reflected in a lower melting point.

In any embodiment, the crystallinity of the fill phase is reduced by the copolymerization of propylene with limited amounts of one or more comonomers selected from: ethylene, $C_4$-$C_{20}$ alpha-olefins, and polyenes.

C. Proportions of Matrix Phase to Fill Phase

Preferably, the fill phase is present in amounts greater than the matrix phase in the heterophasic copolymer. In any embodiment, the matrix phase may be present in the heterophasic copolymer in amount greater than or equal to 8 wt %, greater than or equal to 10 wt %, greater than or equal to 20 wt %, greater than or equal to 30 wt %, greater than or equal to 40 wt %, greater than or equal to 45 wt %, less than 50 wt %, or in a range of 8 to 45 wt %, 8 to 40 wt %, 8 to 20 wt % or 8 to 10 wt %, based on total weight of the matrix and fill phases. In any embodiment, the fill phase may be present in the heterophasic copolymer in amount greater than 50 wt %, greater than or equal to 55 wt %, greater than or equal to 60 wt %, greater than or equal to 70 wt %, greater than or equal to 80 wt %, greater than or equal to 90 wt %, 92 wt %, or in a range of 55 to 92 wt %, 60 to 92 wt %, 70 to 92 wt % or 90 to 92 wt %, based on total weight of the matrix and fill phases. In any embodiment, the matrix phase may be present in the heterophasic copolymer in an amount of 8 to 40 wt % and the fill phase may be present in the heterophasic copolymer in an amount of 60 to 92 wt %%, based on total weight of the matrix and fill phase.

D. Optional Further Components

The heterophasic copolymers describe herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, processing oil, flame retardants, tackifying resins, flow improvers, and the like. Examples of antioxidants include, but are not limited to quinoline, e.g., trimethylhydroxyquinoline (TMQ); imidazole, e.g., zincmercapto toluoyl imidazole (ZMTI); and conventional antioxidants, such as hindered phenols, lactones, and phosphites. The amount of antioxidants used may be within the range of from 0.001 to 5 phr. Antiblocking agents, coloring agents, pigments, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention.

In any embodiment, the heterophasic copolymer may further include an outer shell at least partially surround the matrix phase and the fill phase. The outer shell may comprise any suitable polymer component having a melting point of at least 100° C., for example, an iPP or high density polyethylene (HDPE). The outer shell may have a thickness of 200 to 1,000 nm or 300 to 800 nm.

E. Properties of the Heterophasic Copolymer

In any embodiment, the heterophasic copolymers may have a heat of fusion as determined by DSC, less than or equal to 85 J/g, less than or equal to 75 J/g, less than or equal to 70 J/g, less than or equal to 60 J/g, less than or equal to 50 J/g, less than or equal to 40 J/g, less than or equal to 30 J/g, less than or equal to 20 J/g, less than or equal to 10 J/g, less than or equal to 5 J/g, or 1 J/g. In any embodiment, the heterophasic copolymer has a heat of fusion, as determined by DSC, ranging from a lower limit of 1.0 J/g, or 1.5 J/g, or 3.0 J/g, or 4.0 J/g, or 5.0 J/g, or 6.0 J/g, or 7.0 J/g, to an upper limit of 30 J/g, or 40 J/g, or 50 J/g, or 60 J/g, or 80 J/g, or 85 J/g, for example, 5 to 85 J/g or 5 to 60 J/g.

In any embodiment, the heterophasic copolymers may have an Mw from 50,000 to 1,000,000 g/mol, 100,000 to 1,000,000 g/mol, 200,000 to 1,000,000 g/mol, 300,000 to 900,000 g/mol, or 400,000 to 700,000 g/mol.

In any embodiment, the heterophasic copolymer is in a particulated form (e.g., granules), such as, for example, wherein at least 95% by weight has a particle size (PS) greater than or equal to 0.1 mm, greater than or equal to 0.5 mm, greater than or equal to 1 mm, greater than or equal to 2 mm, greater than or equal to 3 mm, greater than or equal to 4 mm, 5 mm or in a range from 0.1 to 5 mm, 0.5 to 4 mm, 1 to 4 mm or 2 to 3 mm.

In any embodiment, the heterophasic copolymer granules may have limited stickiness to advantageously avoid granule agglomeration in the reactor under the polymerization conditions. Granule agglomeration can cause reactor fouling or non-downloadable products. Many methods can be used to quantify the stickiness of the granules. For example, a mechanical sieve shaker with a series of different mess size sieve pans can be used to obtain particle size distribution curve to determine the stickiness of the heterophasic copolymer granules. If a Gaussian or Gaussian like distribution curve is obtained at room temperature (23° C.), the granules are considered "non-sticky". In any embodiment, the heterophasic copolymer granules may be considered substantially non-sticky. A description of this method for determining stickiness is provided below in Example 4. In any embodiment, if some limited degree of granule agglomeration is allowed, e.g., the distribution may show as a distorted Guassian like distribution such as a higher right shoulder, i.e., if drawing a line at the highest distribution point to divide the distribution curve as two portions, the right portion (i.e., the larger particle portion) can have up to 40 wt % more than the left portion (i.e., the smaller particle portion) based on the total sample weight for testing. The distribution may also display a second distribution on the right side of the main distribution, i.e., having a larger particle distribution, but the second distribution should not be more than 10 wt % of the total weight of the sample for testing and the largest particle size of the second particle distribution should not be larger than 6 mm. Preferably, the distribution doesn't contain a second larger particle distribution; more preferably, the right side of the main distribution is less than 20 wt % more than the left side; most preferably, the distribution is close to symmetrical.

III. Processes for Producing Heterophasic Copolymers

The heterophasic copolymer described herein may be prepared using polymerization processes such as a two-stage process in two reactors or a two-stage process in a single reactor. The same or different polymerization process may be used in each stage. Each stage may be independently carried out in either the gas or liquid slurry phase. For example, the first stage may be conducted in the slurry phase and the second stage may be conducted in the gas phase or vice. Alternatively, each phase may be the same in the various stages, for example, both stages may be conducted in the gas phase. The heterophasic copolymer described herein can be produced in multiple reactors, preferably two or three, operated in series, where matrix phase may be preferably polymerized first in a gas phase, or liquid slurry polymerization process. The fill phase (the polymeric material produced in the presence of the matrix phase) may be preferably polymerized in a second reactor such as a gas phase or slurry phase reactor. In an alternative embodiment, the fill phase can be produced in at least two reactors, in order to obtain fractions with different properties, e.g., varying molecular weights, polydispersities, melt flow rates, or the like.

As used herein "stage" is defined as that portion of a polymerization process during which one component of the in-reactor composition, the fill phase or the matrix phase, is produced. One or multiple reactors may be used during each stage. The same or different polymerization process may be used in each stage.

The stages of the processes of this invention can be carried out in any manner known in the art, in suspension (slurry) or in the gas phase, continuously or batch wise, or any combination thereof, in one or more steps. Homogeneous polymerization processes are useful. For purposes herein, a homogeneous polymerization process is defined to be a process where at least 90 wt % of the product is soluble in the reaction media. A bulk homogeneous process is also useful, wherein for purposes herein a bulk process is defined to be a process where monomer concentration in all feeds to the reactor is 70 volume % or more. Alternately, in embodiments, no solvent or diluent may be present or added in the reaction medium, except for the small amounts used as the carrier for the catalyst system or other additives, or amounts typically found with the monomer; e.g., propane in propylene as is known in the art. The term "gas phase polymerization" refers to the state of the monomers during polymerization, where the "gas phase" refers to the vapor state of the monomers. In another embodiment, a slurry process is used in one or more stages. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase polymerization processes are particularly preferred and can be used in one or more stages.

In any embodiment, if the polymerization is carried out as a slurry polymerization, an inert solvent or diluent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (ISOPAR™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable diluents/solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the diluent/solvent is not aromatic, preferably aromatics are present in the diluent/solvent at less than 1 wt %, preferably less than 0.5 wt %, preferably less than 0 wt % based upon the weight of the diluents/solvents. It is also possible to use mineral spirit or a hydrogenated diesel oil fraction as a solvent. Toluene may also be used. The polymerization is preferably carried out in the liquid monomer(s). If inert solvents are used, the monomer(s) is (are) typically metered in gas or liquid form.

In any embodiment, the monomer in use can be used as solvent in the slurry phase polymerization, for example, propylene under a high enough pressure to turn the gas propylene into a liquid at a given reaction temperature.

In any embodiment, the feed concentration of the monomers and co-monomers for the polymerization, for example, in the first stage, may be 60 vol % solvent or less, or 40 vol % or less, or 20 vol % or less, based on the total volume of the feedstream. In any embodiment, substantially no solvent may be provided to the first stage and/or the second stage, for example, where a gas phase polymerization process is used. As used herein, "substantially no solvent" refers to stream(s) provided to a polymerization stage comprising less than or equal to 1.0 vol % solvent, e.g., 0.8 vol %, 0.5 vol %, 0.1 vol % or 0 vol %. In any embodiment, the polymerization is run in a bulk process.

In any embodiment, polymerizations can be run at any temperature and/or pressure suitable to obtain the desired polymers. Typical temperatures and/or pressures in any stage include a temperature greater than 30° C., or greater than 50° C., or greater than 60° C., or greater than 70° C., or greater than 75° C., or greater than 80° C., or greater than 85° C., alternately less than 300° C., or less than 200° C., or less than 150° C., or less than 140° C., or less than 120° C., or less than 110° C., or less than 100° C., or less than 90° C.; and/or at a pressure in the range of from 100 kPa to 20 MPa, 0.35 MPa to 10 MPa, or from 0.45 MPa to 6 MPa, 100 kPa to 20 MPa, or from 0.5 MPa to 5 MPa.

In any embodiment, polymerization in any stage may include a reaction run time up to 300 minutes, or in the range of from 5 to 250 minutes, or from 10 to 120 minutes. In any embodiment, in a continuous process the polymerization time for all stages may be from 1 to 600 minutes, or 5 to 300 minutes, or from 10 to 120 minutes.

Hydrogen and/or other chain transfer agents (CTA's) may be added to one, two, or more reactors or reaction zones or stages. In any embodiment, hydrogen and/or CTA may be added to control Mw and MFR of the polymer produced. In any embodiment, the overall pressure in the polymerization in each stage may be at least 0.5 bar, or at least 2 bar, or at least 5 bar. In any embodiment, pressures higher than 100 bar, e.g., higher than 80 bar and, in particular, higher than 64 bar may not be utilized. In any embodiment, hydrogen may be present in the polymerization reaction zone at a partial pressure of from 0.001 to 100 psig (0.007 to 690 kPa), or from 0.001 to 50 psig (0.007 to 345 kPa), or from 0.01 to 25 psig (0.07 to 172 kPa), or 0.1 to 10 psig (0.7 to 70 kPa). In any embodiment, hydrogen, and/or CTA, may be added to the first reactor, a second, or third, or subsequent reactor, or any combination thereof. Likewise, in a three stage process hydrogen may be added to the first stage, and/or the second stage, and/or the third stage. In embodiments of the invention, hydrogen is added in a higher concentration to the second stage as compared to the first stage. In an alternate embodiment of the invention, hydrogen is added in a higher concentration to the first stage as compared to the second stage. For further information on stage hydrogen addition in impact copolymer production please see U.S. Ser. No. 61/896,291, filed Oct. 28, 2013, published as US 2015-0119537, incorporated herein by reference.

The CTA can be any desirable chemical compound such as those disclosed in WO 2007/130306. Preferably, the CTA is selected from Group 2, 12 or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where di-ethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl aluminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10, or 20, or 50, or 100, equivalents to 600, or 700, or 800, or 1,000, equivalents relative to the catalyst component. Alternately the CTA is preset at a catalyst complex-to-CTA molar ratio of from 1:3,000 to 10:1; alternatively 1:2,000 to 10:1; alternatively 1:1,000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Polymerization processes can be carried out in each of the stages in a batch, semi-batch, or continuous mode. If two or more reactors (or reaction zones) are used, preferably they are combined so as to form a continuous process. In embodiments, polymerizations can be run at any temperature and/or pressure suitable to obtain the desired polymers. In any embodiment, the process to produce the propylene polymer composition is continuous.

In various aspects, processes for producing the heterophasic copolymer as described herein are provided. In any embodiment, the process comprises a first stage comprising contacting propylene monomer under a first set of polymerization conditions with a catalyst system to form a matrix phase as described herein of the heterophasic copolymer. The catalyst system, as further described below, may comprises a single-site catalyst precursor compound, an activator, and a support. The process may further include a second stage comprising contacting ethylene monomer and optionally, another comonomer (e.g., propylene monomer), with the matrix phase under a second set of polymerization conditions to form a fill phase as described herein for pores of the matrix in the heterophasic copolymer. In any embodiment, the matrix phase may comprise, for example, on the surface of its pores and/or walls, an active catalyst system comprising single-site catalyst precursor compound, an activator, and a support, which may contact the monomer(s) provided in the second stage thereby forming the fill phase at least partially filling the pores in the matrix phase to form the heterophasic copolymer. It is also contemplated herein that the fill phase may extend outside of the pores of the matrix phase and/or partially surround the matrix phase. The first and second set of polymerization conditions may be any suitable conditions as described herein, for example, a temperature of 60° C. to 90° C. and a pressure of 100 kPa to 5 Mpa.

The first and second stages may be performed in the same or different reactors. In any embodiment, the second stage may be performed substantially without solvent, for example, a gas phase process. Additionally, the first stage may performed in a liquid slurry phase. In other embodiments, both the first and the second stages may be performed substantially without solvent, for example, both are gas phase processes.

In any embodiment, in the first stage, propylene and from 0 mol % to 15 mol % $C_2$ and/or $C_4$ to $C_{20}$ alpha olefins (alternately 0.5 to 10 mol %, alternately 0 to 5 mol %, alternately 1 to 5 mol %), based upon molar numbers of the monomer/co-monomer feeds (and optional $H_2$), may be contacted with a catalyst system as further described below under polymerization conditions to form the matrix phase. Alternatively, in the first stage, ethylene and from 0 mol % to 15 mol % $C_3$ to $C_{20}$ alpha olefins (alternately 0.5 to 10 mol %, alternately 0 to 5 mol %, alternately 1 to 5 mol %), based upon molar numbers of the monomer/co-monomer feeds (and optional $H_2$), may be contacted with a catalyst system as further described below under polymerization conditions to form the matrix phase. In the first stage, the monomers preferably comprise propylene or ethylene and optional co-monomers comprising one or more of ethylene, propylene and/or $C_4$ to $C_{20}$ olefins, preferably $C_4$ to $C_{16}$ olefins, or preferably $C_6$ to $C_{12}$ olefins. The $C_4$ to $C_{20}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups. In a preferred embodiment, the monomer in the first stage may be propylene and no co-monomer is present.

In any embodiment, in the second stage, the matrix phase may be contacted with ethylene and from 5 mol % to 40 mol % $C_3$ to $C_{20}$ alpha olefins (alternately 10 mol % to 30 mol %, alternately 10 to 25 mol %), based upon the molar numbers of the monomer/co-monomer feeds, under polymerization conditions to form the fill phase. Alternatively, in the second stage, the matrix phase may be contacted with propylene and from 5 mol % to 40 mol % ethylene or $C_4$ to $C_{20}$ alpha olefins (alternately 10 mol % to 30 mol %, alternately 10 to 25 mol %), based upon the molar numbers of the monomer/co-monomer feeds, under polymerization conditions to form the fill phase. In the second stage, the monomer(s) may contact an active catalyst system as described herein, which may be present on or within the matrix phase (e.g., on the surface of its pores and/or walls) to form the fill phase at least partially filling the pores in the matrix phase to form the heterophasic copolymer. In the second stage, the monomers preferably comprise ethylene and optional co-monomers comprising one or more of propylene and/or $C_4$ to $C_{20}$ olefins, preferably $C_4$ to $C_{16}$ olefins, or preferably $C_6$ to $C_{12}$ olefins. The co-monomers may be linear, branched, or cyclic. The cyclic olefins may be strained or unstrained, monocyclic or polycyclic, and may optionally include heteroatoms and/or one or more functional groups. In a preferred embodiment of the invention, the monomer in the second stage may be ethylene and co-monomer may be present, for example propylene.

Alternately, in the second stage, the matrix phase, ethylene or propylene and optionally from 5 mol % to 40 mol % (alternately 10 mol % to 30 mol %, alternately 10 to 25 mol %), based upon the molar number of the monomer/co-monomer feeds, of one or more co-monomers (such as ethylene, propylene or $C_4$ to $C_{20}$ alpha olefins) are contacted in the presence the catalyst system described herein (e.g., active catalyst system present on or within the matrix phase) and optional hydrogen/CTA, under polymerization conditions to form the fill phase at least partially filling the pores of the matrix phased.

Alternately, in the second stage, the matrix phase, ethylene and propylene are contacted in the presence the catalyst system described herein (e.g., active catalyst system present on or within the matrix phase) and optional hydrogen/CTA, under polymerization conditions to form the fill phase at least partially filling the pores of the matrix phased.

In any embodiment, a further catalyst system may be provided to the second stage in addition to the active catalyst system present on or within the matrix phase. The catalyst systems used in the stages may be the same or different and are preferably the same.

In any embodiment, the first stage may produces a homopolypropylene (e.g., iPP), and the second stage produces a copolymer of ethylene-butene, ethylene-hexene, ethylene-octene, ethylene-propylene, ethylene-propylene-butene, ethylene-propylene-hexene, or ethylene-propylene-octene.

In any embodiment, little or no scavenger may be used in the polymerization in any stage to produce the polymer, i.e., scavenger (such as trialkyl aluminum) is present at a molar ratio of scavenger metal to transition metal of 0:1, alternately less than 100:1, or less than 50:1, or less than 15:1, or less than 10:1, or less than 1:1, or less than 0.1:1.

Other additives may also be used in the polymerization in any stage, as desired, such as one or more scavengers, promoters, modifiers, hydrogen, CTAs other than or in addition to hydrogen (such as diethyl zinc), reducing agents, oxidizing agents, aluminum alkyls, or silanes, or the like.

In any embodiment, the productivity of the catalyst system in a single stage or in all stages combined may be at least 50 g (polymer)/g (cat)/hour, preferably 500 or more g (polymer)/g (cat)/hour, preferably 800 or more g (polymer)/g (cat)/hour, preferably 5,000 or more g (polymer)/g (cat)/hour, preferably 50,000 or more g (polymer)/g (cat)/hour.

In any embodiment, the activity of the catalyst system in a single stage or in all stages combined may be at least 50 kg P/mol cat, preferably 500 or more kg P/mol cat, preferably 5,000 or more kg P/mol cat, preferably 50,000 or more kg P/mol cat. According to any embodiment, the catalyst system in a single stage or in all stages combined may provide a catalyst activity of at least 800, or at least 1,000, or at least 1,500, or at least 2,000 g propylene polymer produced per g of the catalyst precursor compound per hour.

In another embodiment, the conversion of olefin monomer may be at least 10%, based upon polymer yield and the weight of the monomer entering the reaction zone, or 20% or more, or 30% or more, or 50% or more, or 80% or more. A "reaction zone", also referred to as a "polymerization zone" or "stage", is a vessel or portion thereof or combination of vessels, where the polymerization process takes place, for example, a batch reactor. When multiple reactors are used in either series or parallel configuration, each reactor may be considered as a separate polymerization zone or stage. For a multi-stage polymerization in both a batch reactor and a continuous reactor, each polymerization stage is considered as a separate polymerization zone. In any embodiment, the polymerization occurs in one, two, or more reaction zones, preferably one or two reaction zones. In another embodiment, the conversion of olefin monomer is at least 10%, based upon polymer yield and the weight of the monomer entering all reaction zones, or 20% or more, or 30% or more, or 50% or more, or 80% or more.

In any embodiment, the reaction sequence of the first stage and the second stage can be carried out immediately. Alternatively, there can be a period of time between generating the matrix phase and further reacting the matrix phase with additional monomers (e.g., propylene, ethylene) of 1 second or more, alternately 30 seconds or more, alternately 1 minute or more, alternately 15 minutes or more, alternately 30 minutes or more, alternately 1 hour or more, alternately 2 hours or more, alternately 1 day or more, to form the fill phase.

A. Catalyst System

The catalyst systems useful herein may comprise a precursor compound, an activator and a support.

Catalyst Precursor Compounds

In any embodiment, single-site catalysts and/or Ziegler-Natta type catalysts can be used to make the heterogeneous compositions herein. Preferably, a single-site catalyst is used. Most preferably, the single-site catalyst precursor compound may be represented by the following formula:

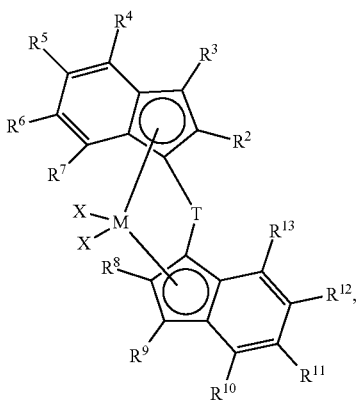

where M is a group 4, 5, or 6 metal; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$, or —PR'$_2$ radical, wherein R' is one of a halogen atom, a $C_1$-$C_{10}$ alkyl group, or a $C_6$-$C_{10}$ aryl group.

According to any embodiment, at least one of $R^2$, $R^3$, $R^4$, $R^5$, $R^6$, $R^7$, $R^8$, $R^9$, $R^{10}$, $R^{11}$, $R^{12}$, and $R^{13}$ may be a cyclopropyl substituent represented by the formula:

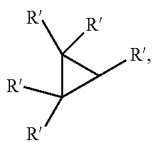

wherein each R' in the cyclopropyls substituent is, independently, hydrogen, a substituted hydrocarbyl group, an unsubstituted hydrocarbyl group, or a halogen.

In any embodiment, at least one of $R^2$ and $R^8$ has at least four carbon atoms, preferably at least six carbon atoms.

According to any embodiment of the invention, M may be selected from titanium, zirconium, hafnium, vanadium, niobium, tantalum, chromium, molybdenum and tungsten; each X may be independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to C40 alkylaryl groups and substituted or unsubstituted $C_7$ to $C_{40}$ arylalkenyl groups; or, optionally, are joined together to form a $C_4$ to $C_{40}$ alkanediyl group or a conjugated $C_4$ to $C_{40}$ diene ligand which is coordinated to M in a metallacyclopentene fashion; or optionally represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with M; each $R^2$, $R^4$, $R^8$ and $R^{10}$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups; and T is selected from:

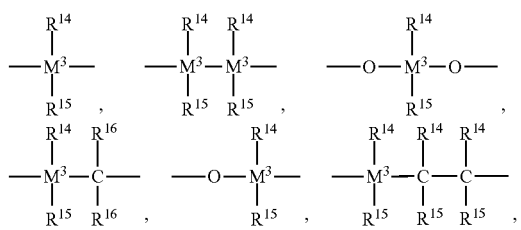

—B($R^{14}$)—, —Al($R^{14}$)—, —Ge—, —Sn—, —O—, —S—, —SO$_2$, —SO$_2$—, —N($R^{14}$)—, —CO—, —P($R^{14}$)—, and —P(O)($R^{14}$)—; wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups and $C_7$ to $C_{40}$ alkylaryl groups, optionally $R^{14}$ and $R^{15}$, together with the atom(s) connecting them, form a ring; and $M^3$ is selected from carbon, silicon, germanium, and tin; or T is represented by the formula:

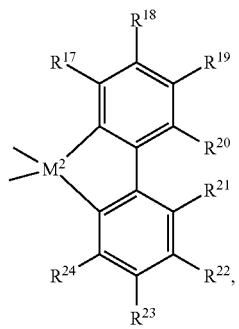

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom.

In any embodiment of the invention in any embodiment of any formula described herein, M is Zr or Hf.

In any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment in any embodiment of any formula described herein, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any formula described herein, each $R^3$, $R^4$, $R^5$, $R^6$, $R^7$, $R^9$, $R^{10}$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In a preferred embodiment in any embodiment of any formula described herein, T is a bridging group and is represented by $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGe\ R'_2$, $R'C=CR'GeR'_2$, $R'B$, $R'_2C$—$BR'$, $R'_2C$—$BR'$—$CR'_2$, $R'_2C$—$O$—$CR'_2$, $R'_2CR'_2C$—$O$—$CR'_2CR'_2$, $R'_2C$—$O$—$CR'_2CR'_2$, $R'_2C$—$O$—$CR'=CR'$, $R'_2C$—$S$—$CR'_2$, $R'_2CR'_2C$—$S$—$CR'_2CR'_2$, $R'_2C$—$S$—$CR'_2CR'_2$, $R'_2C$—$S$—$CR'=CR'$, $R'_2C$—$Se$—$CR'_2$, $R'_2CR'_2C$—$Se$—$CR'_2CR'_2$, $R'_2C$—$Se$—$CR_2CR'_2$, $R'_2C$—$Se$—$CR'=CR'$, $R'_2C$—$N=CR'$, $R'_2C$—$NR'$—$CR'_2$, $R'_2C$—$NR'$—$CR'_2CR'_2$, $R'_2C$—$NR'$—$CR'=CR'$, $R'_2CR'_2C$—$NR'$—$CR'_2CR'_2$, $R'_2C$—$P=CR'$, or $R'_2C$—$PR'$—$CR'_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, T is $CH_2$, $CH_2CH_2$, $C(CH_3)_2$, $SiMe_2$, $SiPh_2$, $SiMePh$, silylcyclobutyl $(Si(CH_2)_3)$, $(Ph)_2C$, $(p$-$(Et)_3SiPh)_2C$, cyclopentasilylene $(Si(CH_2)_4)$, or $Si(CH_2)_5$.

In any embodiment in any embodiment of any formula described herein, $R^4$ and $R^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

In a preferred embodiment, in any embodiment of any formula described herein, $R^2$ and $R^8$ are a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl.

In a preferred embodiment, $R^2$, $R^8$, $R^4$, and $R^{10}$ are as described in the preceding sentence and $R^3$, $R^5$, $R^6$, $R^7$, $R^9$, $R^{11}$, $R^{12}$, and $R^{13}$ are hydrogen.

Most preferably, MCN compounds having the structure in formula 1(b) above are used in the process to form the heterophasic copolymers herein, and more particularly, those a bridged bis-indenyls (zirconocene or hafnocene) that is unsymmetrically substituted in the 2- and 4-indenyl positions on each indenyl ring, and most preferably, where the 2-substitution is a $C_1$ to $C_{10}$ alkyl group and the 4-substitution is a substituted phenyl or biphenyl group. By "unsymmetrical" what is meant is that the groups on each indenyl are different by at least one carbon atom at either or both the 2- or 4-position.

Examples of MCN compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl) zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-orthobiphenyl-2-(1-methylcyclohexyl)methyl-indenyl) (4-(3,5-di-tert-butylphenyl)-2-methyl-indenyl) zirconium dichloride; and dimethylsilylene (4-orthobiphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

In a preferred embodiment, the molar ratio of rac to meso in the catalyst precursor compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater. In any embodiment of the invention, the MCN catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the bridged bis(indenyl)metallocene transition metal compound formed consists essentially of the racemic isomer.

Amounts of rac and meso isomers are determined by proton NMR. $^1$H NMR data are collected at 23° C. in a 5 mm probe using a 400 MHz Bruker spectrometer with deuterated methylene chloride. (Note that some of the examples herein use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

In any embodiment, two or more different MCN catalyst precursor compounds are present in the catalyst system used herein. In any embodiment, two or more different MCN catalyst precursor compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as two non-coordination anions, a non-coordinating anion activator and an alumoxane, or two different alumoxanes can be used in combination. If one or more transition metal compounds contain an X ligand which is not a hydride, hydrocarbyl, or substituted hydrocarbyl, then the alumoxane (or other alkylating agent) is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1,000 to 1,000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

Activators

The catalyst or catalyst precursor must also be combined with at least one "activator" to effect polymerization of the cyclic olefin monomers and ethylene, wherein the activator preferably comprises a non-coordinating borate anion and a bulky organic cation. In any embodiment, the non-coordinating borate anion comprises a tetra(perfluorinated $C_6$ to $C_{14}$ aryl)borate anion and substituted versions thereof; most preferably the non-coordinating borate anion comprises a tetra(pentafluorophenyl)borate anion or tetra(perfluoronaphthyl)borate anion.

In any embodiment the bulky organic cation is selected from the following structures (a) and (b):

wherein each R group is independently hydrogen, a $C_6$ to $C_{14}$ aryl (e.g., phenyl, naphthyl, etc.), a $C_1$ to $C_{10}$ or $C_{20}$ alkyl, or substituted versions thereof; and more preferably at least one R group is an $C_6$ to $C_{14}$ aryl or substituted versions thereof.

In any embodiment, the bulky organic cation is a reducible Lewis Acid, especially a trityl-type cation (wherein each "R" group in (a) is aryl) capable of extracting a ligand from the catalyst precursor, where each "R" group is an $C_6$ to $C_{14}$ aryl group (phenyl, naphthyl, etc.) or substituted $C_6$ to $C_{14}$ aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (b) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers. The catalyst may be formed before combining with monomers, after combining with monomers, or simultaneous therewith.

Alumoxanes may also be used as activators for the single-site catalysts useful herein. Alumoxanes are generally oligomeric, partially hydrolyzed aluminum alkyl compounds containing —Al(R1)-O— sub-units, where $R^1$ is an alkyl group, and may be produced by the hydrolysis of the respective trialkylaluminum compound. Examples of alumoxane activators include methylalumoxane (MAO), ethylalumoxane, butylalumoxane, isobutylalumoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different alumoxanes may also be used as the activator(s).

When the activator is an alumoxane, any embodiment select the maximum amount of activator at a 5,000-fold molar excess Al/M over the catalyst precursor compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1, e.g., 1:1 to 10:1 or 10:1 to 50:1.

Optional Scavengers or Co-Activators

In addition to the activator compounds, scavengers or co-activators may be used.

Suitable co-activators may be selected from the group consisting of: trialkylaluminum, dialkylmagnesium, alkylmagnesium halide, and dialkylzinc. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In any embodiment, the co-activator is selected from the group consisting of: trimethylaluminum, tri ethyl aluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc).

Support

Structure of the support particle material in the catalyst system is preferable in forming the matrix phase as well as the fill phase, particularly with regard to the amount of fill phase that may be present in the heterophasic copolymer. For example, the support particle material structure can enable construction of a matrix phase (e.g., formed in the first stage of polymerization), which may be capable of containing a higher amount of fill phase (e.g., formed in the second stage of polymerization). Another factor that may be related to having a higher amount of fill phase can be the amount of active catalyst residues/debris located on the pore surface of the matrix phase that can allow a higher amount (e.g., majority) of the fill phase to grow inside the pores. The support particle structure can determine the porosity of the derived matrix phase and the active catalyst debris locations and concentration in the derived matrix phase; therefore, the support particle structure can determine the plastomer fill capability in the matrix phase. The plastomer fill capability of the matrix phase is also closely related to the porosity of the matrix phase, i.e., the porosity of the matrix phase polymer particles. As a result, understanding the relationship between the support particle structure and the porosity of the derived matrix phase as well as the relationship between the support particle structure and the active catalyst debris location in the derived matrix phase can help in designing a better catalyst system with a higher plastomer fill capability.

Without wishing to be bound by theory, it is believed that to have increased plastomer fill capability in the matrix phase, support particles (e.g., silica) should have one or more of the following: higher surface area (more porous), include more uniform and smaller sub-particles (i.e., more uniform macropores), and a larger main particle size, while also considering the mechanical strength of the support particle, the polymerization heat removal efficiency in a growing polymer granule, and the activator molecular size (e.g., the polymeric MAO molecule). For example, the mechanical strength of the support particle should be strong enough not to cause undesired "agitation fragmentation" and catalyst component related "expansion fragmentation" (e.g., MAO "expansion fragmentation") but not too strong to allow the polymer growing "expansion fragmentation", as described earlier. Additionally, the mechanical strength of a support particle (e.g., silica) may be related to many other support structure parameters. For example, if the surface area and the pore volume (or pore diameter) are both very high, e.g., greater than $800 \text{ m}^2/\text{g}$ and greater than $3 \text{ mL/g}$ (or 60 nm), the support particle (e.g., silica) wall thickness can become very thin, which may be easy to break under normal catalyst preparation conditions. Therefore, as the surface area is increased for improving fill phase capability, the pore volume (or pore diameter) may be reduced accordingly to maintain the mechanical strength of the support particle. Also, experimental results show that an activator molecule, such as an MAO molecule, cannot enter a pore having a pore diameter above 5 nm, but if the pore diameter is too large, e.g., 6-7 nm, MAO can fall out of the pores. On the other hand, the desired polymerization expansion fragmentation prefers pore diameter of the support particle in the range of 8-80 nm. However, too large of a pore diameter can delay the desired polymerization expansion fragmentation or create hollow spaces that decrease the polymer bulk density, which may link to poor flow-ability in a gas phase reactor and should be avoided. Without polymer expansion fragmentation, the catalyst activity may be low. Although a larger main silica particle size may be desired, too large a main particle can cause heat removal deficiency becoming too hot in the center of the growing polymer and causing problems, e.g., significantly lower molecular weight or even melted polymer that causes a reactor fouling.

Figure 2:
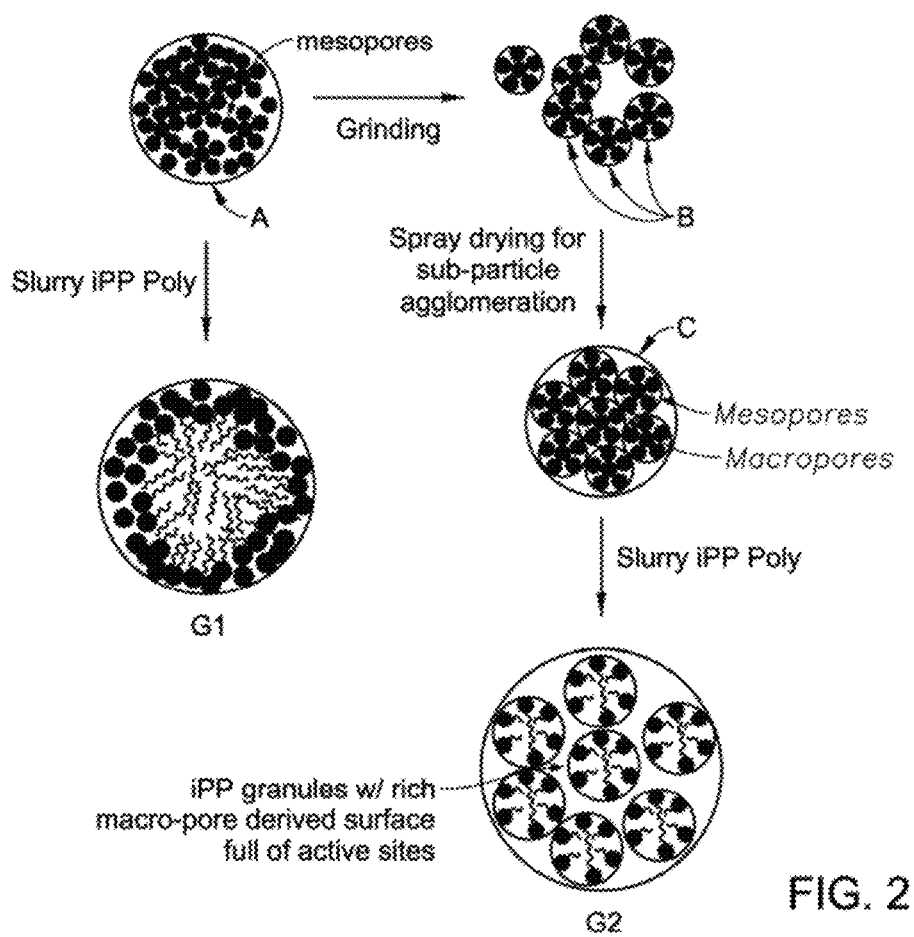
FIG. 2 is a schematic illustrating polymerization using a regular form support particle and a sub-particle form support particle.

The sub-particle containing structure is a factor related to the heterophasic copolymer with a very high plastomer fill capability, e.g., greater than 85 wt %. Without wishing to be bound by theory, to illustrate the sub-particle's role in the fill phase growing mechanism based on the Ziegler-Natta ICP rubber phase growing studies (Cecchin et al. (2001) 202 *Macromol. Chem. Phys.* 1987-1994), the regular form (non-sub-particle containing) support particle and sub-particle form support particles are compared as depicted in FIG. 2. As shown in FIG. 2, the regular form support particle is represented by Particle A, which represents a main particle consisting of primary particles (as solid dots). After a slurry polymerization process, for example to form an iPP matrix phase, iPP granules G1 are formed, which shows iPP (squiggly lines) formed within the main particle of a regular form support particle. Also shown in FIG. 2 is the sub-particle form of the support particles, which is represented by Particles B (sub-particles). Particles B can be re-agglomerated, e.g., through the so-called spray drying technology, to form Particle C, which represents an agglomeration (or aggregation) of sub-particles (Particles B). After a similar slurry polymerization process for example to form an iPP matrix phase, iPP granules G2 are formed, which show iPP (squiggly lines) formed within the sub-particles. Due to the structure of Granules G1, the only available space for the fill phase to fill is the outer surface of the primary particles because the interior of the main particle is filled with iPP. In contrast, Granules G2 include a larger macropore derived space between sub-particles in which the fill phase can inhabit. Thus, using support particles having a sub-particle form can increase the plastomer fill capability in the matrix phase, particularly when compared to regular form support particles.

Although support particles having sub-particle form is preferred, particularly for increased plastomer fill capability in the matrix phase, it is contemplated herein that support particles in regular form may be also be used. For example, regular form support particles may be used to form a heterophasic copolymer having a fill phase of 60 wt % or less.

In any embodiment, the catalyst system may comprise porous solid particles as an inert support material to which the catalyst precursor compound and/or activator may be anchored, bound, adsorbed or the like. Preferably, the support material is an inorganic oxide in a finely divided form. Suitable inorganic oxide materials for use in MCN catalyst systems herein include Groups 2, 4, 13, and 14 metal oxides, such as silica, alumina, magnesia, titania, zirconia, and the like, and mixtures thereof. Other suitable support materials, however, can be employed, for example, finely divided functionalized polyolefins, such as finely divided polyethylene or polypropylene. Particularly useful supports include silica, magnesia, titania, zirconia, montmorillonite, phyllosilicate, zeolites, talc, clays, and the like. Also, combinations of these support materials may be used, for example, silica-chromium, silica-alumina, silica-titania, and the like.

In some preferred embodiments, the support material preferably comprises silica, e.g., amorphous silica, which may include a hydrated surface presenting hydroxyl or other groups which can be deprotonated to form reactive sites to anchor activators and/or catalyst precursors. Other porous support materials may optionally be present with the preferred silica as a co-support, for example, talc, other inorganic oxides, zeolites, clays, organoclays, or any other organic or inorganic support material and the like, or mixtures thereof.

The support materials of any embodiment of the invention, unexpectedly, are generally resistant to agitation fragmentation or expansion fragmentation during calcination temperatures. In any embodiment, the support can be calcined essentially free of fragmentation, i.e., the PS distribution is not changed significantly and/or less than 5 vol % of primary particles (if present) and/or fines is generated, by total volume of the support material.

According to any embodiment of the invention, the support material is then contacted with the activator as described herein, at least one single-site catalyst precursor compound as described herein, and/or activator as described herein, and optionally a scavenger or co-activator as described herein.

According to any embodiment of the invention, the support in, and/or used to prepare, the catalyst system, preferably has or comprises the following:

a) an average particle size (PS) and/or a PS mode greater than or equal to 60 μm, greater than or equal to 65 μm, greater than or equal to 70 μm, greater than or equal to 75 μm, greater than or equal to 80 μm, or greater than or equal to 85 μm, greater than or equal to 90 μm, greater than or equal to 100 μm, greater than or equal to 120 μm; and/or less than or equal to 300 μm, less than or equal to 275 μm, less than or equal to 225 μm, less than or equal to 200 μm, less than or equal to 180 μm, less than or equal to 160 μm, less than or equal to 150 μm, less than or equal to 130 μm; e.g., 30 to 300 μm, 40 to 275 μm, or 50 to 250 μm, or 60 to 250 μm;

b) a pore volume (PV) from greater than or equal to 0.1 mL/g, greater than or equal to 0.15 mL/g, greater than or equal to 0.2 mL/g, greater than or equal to 0.25 mL/g, greater than or equal to 0.3 mL/g, greater than or equal to 0.5 mL/g, greater than or equal to 1 mL/g, greater than or equal to 1.5 mL/g, greater than or equal to 2.0 mL/g; and/or less than or equal to 3.0 mL/g, less than or equal to 2.5 mL/g, less than or equal to 2.0 mL/g, less than or equal to 1.6 mL/g, less than or equal to 1.5 mL/g, less than or equal to 1.4 mL/g, less than or equal to 1.3 mL/g; e.g., 0.5 to 2 mL/g, or 0.5 to 1.5 mL/g, or 1.1 to 1.6 mL/g;

c) a specific surface area (SA) less than or equal to 800 $m^2/g$, less than or equal to 750 $m^2/g$, less than or equal to 700 $m^2/g$, less than or equal to 650 $m^2/g$; and/or greater than or equal to 300 $m^2/g$, greater than or equal to 400 $m^2/g$, or greater than or equal to 600 $m^2/g$, greater than or equal to 650 $m^2/g$, greater than or equal to 700 $m^2/g$; e.g., 400 to 650 $m^2/g$, or 400 to 800 $m^2/g$;

d) a mean pore diameter (PD) greater than or equal to 8 nm, greater than or equal to 10 nm; greater than or equal to 15 nm greater than or equal to 20 nm; and/or less than or equal to 25 nm, less than or equal to 20 nm, or less than or equal to 15 nm, less than or equal to 13 nm, less than or equal to 12 nm, less than or equal to 10 nm, less than or equal to 8 nm, or 8-13 nm, or 8-20 nm, or 9-20 nm, or 10 to 25 nm, or 8-25 nm;

e) sub-particles having an average PS of 0.01 μm to 20 μm, 0.01 μm to 7 μm, 0.01 μm to 5 μm, or 0.1 μm to 1 μm;

f) agglomerates comprising at least a portion of the sub-particles, wherein the sub-particles in the agglomerates may have a particle size distribution (PSD) D10 greater than or equal to 80% of D50 and D90 less than or equal to 120% of D50, preferably the sub-particles in the agglomerates are substantially uniform in size;

g) microencapsulated agglomerates;

h) spray dried;

i) silica, e.g., amorphous silica and/or silica having a hydrated surface; and/or j) any combination or subcombination thereof.

In any embodiment, the support comprises an agglomerate of a plurality of sub-particles, and in further embodiments the support is at least partially encapsulated. Additionally or alternatively, the support comprises a spray dried material, e.g., spray dried silica. In embodiments according to the present invention, the support materials, in addition to meeting the PS, SA, PV, and PD characteristics, are preferably made from a process that agglomerates smaller sub-particles that contain primary particles, e.g., average PS in the range of 0.01-5 μm, into larger agglomerations (or aggregations) of sub-particles with average PS in the range of 70 to 200 μm, such as those from a spray drying process. The larger agglomerations (or aggregations) may thus comprise smaller sub-particles. Either or both of the agglomerates and/or sub-particles can have high or low sphericity and roundness, e.g., a Wadell sphericity of 0.8 or more, 0.85 or more, 0.9 or more, or 0.95 or more, or less than 0.95, less than 0.90, less than 0.85, or less than 0.8; and a Wadell roundness from 0.1 or less, up to 0.9 or more.

The SA, PV, and mean PD, are generally interrelated, in any embodiment, in that within certain ranges of these parameters the product of the mean PD and SA may be proportional to the PV. The PV, PD, and SA in any embodiment are preferably selected to balance the desired mechanical strength with the desired activator loading, i.e., high SA to accommodate high activator and catalyst loading, yet not too high so as to maintain sufficient strength to avoid fragmentation during calcination or from agitation and handling, while at the same time avoiding excessive strength, which might undesirably inhibit fragmentation during polymerization in any embodiment. Preferably, to meet these requirements the support materials in any embodiment of the invention have PS in the range of 60 to 250 μm, SA 400 to 800 $m^2/g$, PV 0.5 to 2 mL/g, mean PD 6-20 nm, and optionally sub-particles having PS of 0.01 to 5 μm. Silicas which may be suitable according to any embodiment of the invention are commercially available under the trade designations D 150-60A, D 100-100A, D 70-120, PD 13054, PD 14024, and the like. This combination of property ranges is in contrast to most other silica supports used for MCN catalysts for iPP. For example, if the SA is too low, the activity may be low; if the PV is too high, the particles may be mechanically fragile; if the PS and/or PV are too small, the result may be low activity, low porosity, low rubber fill, excess surface-deposited rubber, and/or reactor fouling; and if the PS is too large, heat removal is inefficient, monomer mobility into the interior of the polymer particle is limited, monomer concentration is insufficient, chain termination is premature, and/or low molecular weights result.

In any embodiment, agglomerates (or aggregates) of sub-particles having, within the preferred ranges of SA greater than or equal to 400 $m^2/g$ and mean PD=6 to 20 nm, either a lower SA, e.g., less than 700 $m^2/g$ or less than 650 $m^2/g$, and/or a higher mean PD, e.g., more than 6 nm or more than 8 nm, have higher strength and are more resistant to debris dominated fragmentation during the supportation process, which can thus be carried out at higher temperatures, and higher catalyst loadings can be achieved for higher catalyst activity.

In some other embodiments, on the other hand, agglomerates (or aggregates) of sub-particles with SA greater than 650 $m^2/g$ or greater than 700 $m^2/g$, and mean PD less than 9 nm or less than 8 nm, can be prepared with minimal fragmentation with carefully controlled process conditions such as low supportation reaction temperatures, and yet may more readily fragment during polymerization, which can lead to relatively higher propylene polymer porosity and/or higher fill phase content in the case of heterophasic copolymers.

The support material can be used wet, i.e., containing adsorbed water, or dry, that is, free of absorbed water. The amount of absorbed water can be determined by standard analytical methods, e.g., LOD (loss of drying) from an instrument such as LECO TGA 701 under conditions such as 300° C. for 3 hours. In any embodiment, wet support material (without calcining) can be contacted with the activator or another organometallic compound as otherwise described below, with the addition of additional organometallic or other scavenger compound that can react with or otherwise remove the water, such as a metal alkyl. For example, contacting wet silica with an aluminum alkyl such as AlMe3, usually diluted in an organic solvent such as toluene or isohexane, forms in-situ MAO, and if desired additional MAO can be added to control the desired amount of MAO loaded on the support, in a manner otherwise similar as described below for dry silica.

Drying of the support material can be effected according to any embodiment of the invention by heating or calcining above 100° C., e.g., from 100° C. to 1,000° C., preferably at least 200° C. When the support material is silica, according to any embodiment of the invention it is heated to at least 130° C., preferably 130° C. to 850° C., and most preferably at 200 to 600° C.; and for a time of 1 minute to 100 hours, e.g., from 12 hours to 72 hours, or from 24 hours to 60 hours. The calcined support material in any embodiment according to this invention, comprises at least some groups reactive with an organometallic compound, e.g., reactive hydroxyl (OH) groups to produce the supported catalyst systems as described herein.

Supportation

According to any embodiment, the support is treated with an organometallic compound to react with deprotonated reactive sites on the support surface. In general the support is treated first with an organometallic activator such as MAO, and then the supported activator is treated with the MCN, optional metal alkyl co-activator, as in the following discussion for illustrative purposes, although the MCN and or co-activator can be loaded first, followed by contact with the other catalyst system components, especially where the activator is not an organometallic compound or otherwise reactive with the support surface.

The support material in any embodiment, having reactive surface groups, typically hydroxyl groups, e.g., after calcining (or metal alkyl treatment, e.g., in the wet process), is slurried in a non-polar solvent and contacted with the organometallic compound (activator in this example), preferably dissolved in the solvent, preferably for a period of time in the range of from 0.5 hours to 24 hours, from 2 hours to 16 hours, or from 4 hours to 8 hours. Suitable non-polar solvents are materials in which are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from −60° C. up to 130 or 140° C., such as, for example: 40° C. or below, 23° C. or below, −20° C. or below; from 10° C. or 20° C. up to 60° C. or 40° C.; 23° C. or 25° C. or above; or from 40° C., 60° C., or 80° C. up to 100° C., or 120° C. Where the support may be susceptible to fragmentation during activator/catalyst precursor supportation (e.g., SA greater than or equal to 650 $m^2/g$, PD less than or equal to 7 nm), fragmentation can be controlled through the manipulation of reaction conditions to inhibit fragmentation such as at a lower reaction temperature, e.g., −60 to 40° C., preferably −20° C. to 30° C., to achieve less than 10 vol % fragmented particles, preferably less than 5 vol % fragmented particles; or to promote fragmentation such as at a higher reaction temperature, e.g., greater than or equal to 40° C., preferably greater than or equal to greater than or equal to 60° C., to achieve greater than 10 vol % fragmented particles, e.g., 10 to 80 vol % fragmented particles, such as 10 to 20 vol % fragmented particles, 20 to 70 vol % fragmented particles, 70 to 90 vol % fragmented particles, greater than 90 vol % fragmented particles, or the like. In general, the time and temperature required to promote fragmentation are inversely related, i.e., at a higher temperature, debris dominated fragmentation may require a shorter period of time.

According to any embodiment of the present invention, the support material is not fragmented during supportation or other treatment prior to polymerization, i.e., the supported catalyst system has a PSD that is essentially maintained upon treatment with the organometallic compound and/or less than 5 vol % of fines is generated by volume of the total support material, e.g., where the support material is resistant to fragmentation, or supportation conditions are selected to inhibit fragmentation.

Maintaining a sufficiently large average PS or PS mode of the supported catalyst system material, according to any embodiment of the invention, facilitates the formation of sufficiently large matrix polymer particles rich with small pores, which can, for example, be readily filled with rubber fill, e.g., in making an ICP or other heterophasic copolymer. On the other hand, an excess of porous polypropylene fines, e.g., 5 vol % or more smaller than 120 µm, generally formed from smaller particles such as the primary particles of the support material agglomerates or sub-primary particle debris or fines, or the leaching of solid MAO, that may result from support catalyst debris smaller than 1 µm or 0.4 µm, may result in fouling or plugging of the reactor, lines or equipment during the polymerization of a rubber in the presence of the porous polypropylene or vice versa, and/or in the formation of non-particulated polymer.

NCAs, (such as including perfluoro aromatic group containing boranes, borates, or aluminates) can be supported on a support based on reported methods, such as those described in U.S. Pat. Nos. 5,643,847; 7,012,121; 7,928,172; 7,897,707; and the like.

In any embodiment according to the present invention, the supported catalysts, e.g., on silica with balanced PS, PSD, SA, PV, and PD, such as, for example, PS 70 to 100 µm, SA 400 to 650 $m^2$/g, PV 1.1-1.6 mL/g, and PD 9-12 nm, and prepared under low fragmentation conditions, are able to polymerize monomers (such as propylene) to produce matrix phase resins, and/or having relatively high porosity, e.g., greater than 30%. Furthermore, highly porous structures can house active catalytic species to continue polymerizing additional monomers to form second phase copolymers in heterophasic copolymers such as ICP with improved physical/chemical properties. ICP resins prepared from the catalysts based on MAO supported on support materials as disclosed herein have been discovered to show improved ethylene-propylene (EP) rubber loading and balanced flexibility and process ability.

In contrast to known catalyst support materials which have a conventional unimodal distribution of particle sizes, the mixtures of finished supported catalysts having bimodal PSD, lead to controllable fill phase properties with the result that the different fill phase properties can be balanced as desired through the selection of supports with different PSD modes. Additionally, in any embodiment, the PSD of the resulting matrix phase resin changes according to the PSD of the supported catalyst system, i.e., support particles in the smaller PSD mode portion produce smaller matrix phase particles relative to the larger matrix phase particles formed from the support particles in the larger PSD mode portion.

In any embodiment, a catalyst system is provided comprising a single-site catalyst precursor as described herein, an activator as described herein and a support as described herein. In particular, the support can have one or more of the following:

(i) a surface area of 400 to 800 $m^2$/g or more,
(ii) an average particle size of 60 to 250 µm,
(iii) an average pore diameter of 6-20 nm,
(iv) a pore volume of 0.50 to 2 ml/g,
(v) sub-particles having an average particle size of 0.01-5 µm, and
(vi) agglomerates comprising a portion of the sub-particles, wherein sub-particles in the agglomerates have a particle size distribution D10 greater than or equal to 80% of D50 and D90 less than or equal to 120% of D50.

This invention also relates to:
1. A heterophasic copolymer comprising:
   1) a matrix phase having a melting point of at least 100° C. and comprising:
      (i) at least 95 mol % propylene-derived units; or
      (ii) at least 95 mol % ethylene-derived units; and
         wherein the matrix phase is a sponge-like structure having an average wall thickness of up to 3 µm and wherein the matrix phase comprises at least 8 wt % of the heterophasic copolymer, based on the total weight of the matrix and fill phases; and
   2) a fill phase present as domains at least partially filling pores in the matrix phase, wherein the fill phase comprises:
      (i) at least 60 mol % propylene-derived units and at least 5 mol % ethylene-derived units; or
      (ii) at least 60 mol % ethylene-derived units and at least 5 mol % propylene-derived units; and
   3) the heterophasic copolymer having a 2nd melt heat of fusion less than or equal to 85 J/g for propylene based fill phase and 120 J/g for ethylene based fill phase for the entire heterophasic polymer, wherein the domains have an average area of 0.5 to 20 $\mu m^2$, and wherein the fill phase comprises at least 60 wt % of the heterophasic copolymer, based on the total weight of the matrix and fill phases.
2. The heterophasic copolymer of paragraph 1, wherein the copolymer is in particle form and has an average particle size of 1 mm to 4 mm.
3. The heterophasic copolymer of paragraph 1 or 2, wherein the matrix phase comprises: (i) 95 to 100 mol % propylene-derived units and 0 to 5 mol % ethylene-derived units; or (ii) 95 to 100 mol % ethylene-derived units and 0 to 5 mol % $C_4$-$C^{10}$ alpha olefin-derived units.
4. The heterophasic copolymer of any one of the previous paragraphs, wherein the fill phase comprises: (i) 60 to 95 mol % propylene-derived units and 5 to 40 mol % ethylene-derived units; or (ii) 60 to 95 mol % ethylene-derived units and 5 to 40 mol % propylene-derived units.
5. The heterophasic copolymer of any one of the previous paragraphs has a heat of fusion of 5 to 85 J/g for propylene based polymers and 5 to 120 J/g for ethylene based polymers.
6. The heterophasic copolymer of any one of the previous paragraphs, wherein the total area of the domains is at least 40% of the total area of the heterophasic copolymer.
7. The heterophasic copolymer of any one of the previous paragraphs, wherein the matrix phase comprises at 10 to 40 wt % of the heterophasic copolymer, and the fill phase comprises at 60 to 90 wt % of the heterophasic copolymer, based on the total weight of the matrix and fill phases.
8. The heterophasic copolymer of any one of the previous paragraphs, wherein the heterophasic copolymer has an Mw of 200,000 to 1,000,000 g/mol.
9. The heterophasic copolymer of any one of the previous paragraphs, further comprising an outer shell comprising isotactic-polypropylene (iPP), wherein the outer shell has a thickness of 200 to 1,000 nm.

10. A process for producing a heterophasic copolymer, comprising:
    (a) a first stage comprising contacting propylene monomer under a first set of polymerization conditions with a catalyst system to form a matrix phase of the heterophasic copolymer comprising at least 90 wt % propylene derived units, wherein the catalyst system comprises a single-site catalyst precursor compound, an activator, and a support having:
        (i) a surface area of 400 to 800 $m^2/g$ or more,
        (ii) an average particle size of 60 to 250 μm, and
        (iii) optionally, sub-particles having an average particle size of 0.01-5 μm; and
    (b) a second stage comprising contacting ethylene monomer and optionally, propylene monomer, with the matrix phase under a second set of polymerization conditions to form a fill phase for pores of the matrix in the heterophasic copolymer, wherein the second stage is preformed substantially without solvent and wherein the first and second stage are performed in the same or different reactors.

11. The process of paragraph 10, wherein the first stage is performed in a liquid slurry phase and/or the second stage is performed in a gas phase.

12. The process of paragraph 10, wherein the first stage is performed substantially without solvent.

13. The process of any one of paragraphs 10 to 12, wherein the single-site catalyst is a bridged bis-indenyl (zirconocene or hafnocene) that is unsymmetrically substituted in the 2- and 4-indenyl positions on each indenyl ring.

14. The process of any one of paragraphs 10 to 13, wherein the support is selected from the group consisting of silica, alumina, magnesia, titania, zirconia, montmorillonite, phyllosilicate, a zeolite, talc, a clay, and a combination thereof 15. The process of any one of paragraphs 10 to 14, wherein the catalyst system further comprises a co-support selected from the group consisting of talc, an inorganic oxide, a zeolite, a clay, an organoclay, and a combination thereof 16. The process of any one of paragraphs 10 to 15, wherein the support has an average pore diameter of 6 to 20 nm and a pore volume of 0.50 to 2 ml/g.

17. The process of any one of paragraphs 10 to 16, wherein the support comprises agglomerates of sub-particles.

18. The process of any one of paragraphs 10 to 17, wherein the activator comprises alumoxane.

19. The process of claim any one of paragraphs 10 to 18, wherein the first set and the second set of polymerization conditions comprise a temperature of 60° C. to 90° C. and a pressure of 100 kPa to 5 MPa.

20. The process of any one of paragraphs 10 to 19, wherein the matrix phase produced during the first stage comprises active catalyst molecules.

21. The process of any one of paragraphs 10 to 20, further comprising contacting ethylene monomer with the propylene monomer and the catalyst system in the first stage.

22. The process of any one of paragraphs 10 to 21, wherein:
    the matrix phase has a melting point of at least 100° C. and comprises:
        (i) at least 95 mol % propylene-derived units; or
        (ii) at least 95 mol % ethylene-derived units; and
    wherein the matrix phase is a sponge-like structure having an average wall thickness of up to 3 μm and wherein the matrix phase comprises at least 8 wt % of the heterophasic copolymer, based on the total weight of the matrix and fill phases; and the fill phase is present as domains at least partially filling pores in the matrix phase, wherein the fill phase comprises:
        (i) at least 60 mol % propylene-derived units and at least 5 mol % ethylene-derived units; or
        (ii) at least 60 mol % ethylene-derived units and at least 5 mol % propylene-derived units; and has a heat of fusion less than or equal to 85 J/g;
    wherein the domains have an average area of 0.5 to 20 $\mu m^2$; and wherein the fill phase comprises at least 60 wt % of the heterophasic copolymer, based on the total weight of the matrix and fill phases.

23. The process of any one of paragraphs 10 to 22, wherein the heterophasic copolymer is in particle form and has an average particle size of 1 mm to 4 mm.

EXAMPLES

Materials

Methylaluminoxane (MAO) solution (30% MAO in toluene) was obtained from Albemarle Corporation (Baton Rouge, La.) and used as received. Tri-iso-butylaluminum (TIBAL) and tri-n-octylaluminom (TNOAL) were obtained from Sigma Aldrich and used as received. PD14024 and PD13054 silica were obtained from PQ Corporation and D15060A, D100-100A, and D70-120A silica were obtained from AGC Chemicals Americas, Inc. The silica properties are shown in Table 1 below. All solvents, obtained from Sigma Aldrich, were anhydrous grade and were further treated with activated 3 Å molecular sieves by storing the solvent in a container with 5 to 10 wt % molecular sieves at least overnight (8 to 12 hours) before use. All reactions were performed under an inert nitrogen atmosphere, unless otherwise stated. All deuterated solvents were obtained from Cambridge Isotopes (Cambridge, Mass.) and dried over 3 Å molecular sieves before use.

TABLE 1

Commercial Silica for Use as Catalyst Support

| Commercial Name | Particle Size (μm) | Surface Area ($m^2/g$) | Pore Diameter (Å) | Sub-particle Structure |
| --- | --- | --- | --- | --- |
| PD14024 | 85 | 611 | 92 | Yes |
| PD13054 | 130 | 671 | 66 | Yes |
| D70-120A | 70 | 450 | 120 | No |
| D100-100A | 100 | 543 | 111 | No |
| D150-60A | 150 | 733 | 64 | No |

Differential Scanning Calorimetry (DSC)

Peak crystallization temperature ($T_c$), peak melting temperature ($T_m$), heat of fusion ($H_f$) and glass transition temperature (Tg) are measured via differential scanning calorimetry (DSC) using a DSCQ200 unit. The sample is first equilibrated at 25° C. and subsequently heated to 220° C. using a heating rate of 10° C./min (first heat). The sample is held at 220° C. for 3 min. The sample is subsequently cooled down to −100° C. with a constant cooling rate of 10° C./min (first cool). The sample is equilibrated at −100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and $T_m$ corresponding to 10° C./min heating rate is determined. Areas under the DSC curve are used to determine $H_f$, upon melting or $H_c$, upon crystallization, and Tg.

GPC-4D (or GPC-IR) Analysis for Molecular Weight Determination

The distribution and the moments of molecular weight (Mw, Mn, Mw/Mn, etc.) and the comonomer content (C2, C3, C6, etc.) were determined with a high temperature Gel Permeation Chromatography (PolymerChar GPC-IR) equipped with a multiple-channel band filter based infrared detector ensemble IR5, in which a broad-band channel was used to measure the polymer concentration while two narrow-band channels were used for characterizing composition. Three Agilent PLgel 10 µm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 µm Teflon filter and degassed with an online degasser before entering the GPC instrument. The nominal flow rate was 1.0 mL/min and the nominal injection volume was 200 µL. The whole system including transfer lines, columns, detectors were contained in an oven maintained at 145° C. Given amount of polymer sample was weighed and sealed in a standard vial with 80 µL flow marker (Heptane) added to it. After loading the vial in the autosampler, polymer was automatically dissolved in the instrument with 8 mL added TCB solvent. The polymer was dissolved at 160° C. with continuous shaking for 1 hour for most PE samples or 2 hour for PP samples. The TCB densities used in concentration calculation are 1.463 g/ml at room temperature (23° C.) and 1.284 g/ml at 145° C. The sample solution concentration was from 0.2 to 2.0 mg/ml, with lower concentrations used for higher molecular weight samples.

The concentration, c, at each point in the chromatogram was calculated from the baseline-subtracted IR5 broadband signal, I, using the following equation:

$$c = \alpha I,$$

where α is the mass constant determined with PE or PP standards. The mass recovery was calculated from the ratio of the integrated area of the concentration chromatography over elution volume and the injection mass which is equal to the pre-determined concentration multiplied by injection loop volume.

The molecular weight was determined by combining universal calibration relationship with the column calibration which was performed with a series of monodispersed polystyrene (PS) standards. The MW was calculated at each elution volume with following equation.

$$\log M_X = \frac{\log(K_{PS}/K_X)}{a_X + 1} + \frac{a_{PS} + 1}{a_X + 1} \log M_{PS},$$

where the variables with subscript "X" stand for the test sample while those with subscript "PS" stand for PS. In this method, $a_{PS}=0.67$ and $K_{PS}=0.000175$ while $a_X$ and $K_X$ were obtained from published literature. Specifically, a/K=0.695/0.000579 for PE and 0.705/0.0002288 for PP.

The comonomer composition was determined by the ratio of the IR detector intensity corresponding to $CH_2$ and $CH_3$ channel calibrated with a series of PE and PP homo/copolymer standards whose nominal value were predetermined by NMR or FTIR.

High Performance Liquid Chromatography-Size Exclusion Chromatography (HPLC-SEC) Method Trichlorobenzene (TCB) purchased from Aldrich reagent grade was filtered through a 0.1 µm Teflon filter before use. The 1-decanol was used as received from Alpha Aesar.

The HPLC-SEC sample was prepared by placing dry polymer in glass vials, then the Polymer Characterization autosampler transferred desired amount of 1-decanol and heated the mixture at 160° C. with continuous shaking for 1.5 hours. All quantities were measured gravimetrically. The injection concentration was from 0.1 to 2.0 mg/mL.

The autosampler injected 100 µL of the above prepared sample solution into instrument. The HPLC had a varying gradient composition of mobile phase of 1-decanol and TCB, beginning with 100 vol % of 1-decanol under nominal flow rate of 0.025 mL/min. After sample injection, the mobile phase of HPLC was programmatically adjusted with varying linear gradient changes from 0 vol % TCB/min to 100 vol % TCB/min over certain period of times. The HPLC gradient profiles used for this analysis over 300 min analysis time was 0% of TCB (0 min), 30% of TCB (150 min), 30% of TCB (170 min), 50% of TCB (190 min), 100% TCB (200 min) and 100% of TCB (300 min). A sampling loop collected HPLC eluents and transfers into SEC every 2 minutes. The SEC had 1,2,4-trichlorobenzene (TCB) as mobile phase with the nominal flow rate of 5 mL/min. The eluents were analyzed with Polymer Characterization IR5 detector for mass concentration and chemical composition.

$^{13}$CNMR Method $^{13}$C Nuclear Magnetic Resonance (NMR) spectroscopy was performed using a Pulsed Fourier Transform Superconducting NMR Spectrometer (FT-NMR). Each polymer sample was placed in an NMR tube and then weighed. Solvent (deuterated tetrachloroethane ($TCE-d_2$) or benzene (benzene-$d_6$) was added to the polymer sample in the NMR tube. The NMR tube with the polymer sample was placed on a heater block and agitated until the polymer sample appeared to dissolve and a homogenous solution was observed. The sample tube was removed from the heater block and capped. The sample tube was loaded into a turbine in the pre-set depth gauge located at the top of the magnet. The sample tube was allowed to equilibrate for 10 to 20 minutes and sample spinning and temperature were regulated.

The probes used were 5 mm Variable Temperature BBFO (500 MHz) or 10 mm cyroprobe (600 MHz and 700 MHz). The probe temperature was 120° C. to 125° C. The run conditions are shown below in Table 2.

TABLE 2

| $^{13}$CNMR Acquisition Conditions | |
|---|---|
| Parameter | Setting |
| Lock Solvent | $TCE-d_2$ or benzene-$d_6$ |
| Relaxation Delay (D1) (seconds) | greater than or equal to 10 |
| Number of Scans or Transients (NT) | greater than or equal to 512 |
| Decoupling | Proton |
| Pulse Width | 90° |
| Decoupling Mode: | Waltz-16 or 64, or bi-Waltz-65-256 decoupling |
| Sweep Width (ppm) | 204.454 |
| Acquisition Time (seconds) | 2 |
| Spinning Speed | 10 Hz |
| Number of Pulses | Variable |

The NMR data was analyzed using VNMRJ, Topspin or MestReNova software.

The spectral regions for ethylene propylene copolymers are shown below in Table 3.

TABLE 3

| Region Intensity | Chemical Shift Range (ppm) | Contributing Sequences |
|---|---|---|
| A | 44-48.5 | [PPP] + 0.5*[PPE] |
| B | 37-39.5 | [EPE] + 0.5*[PPE] + [PEP] + 0.5*[EEP] |
| C | 33-34 | [EPE] |
| D | 30.7-31 | [EPP] + [PEEP] |
| E | 30.4 | [PEEE] |
| F | 29.9 | [EEE]n |
| G | 28-29.3 | [PPP] |
| H | 27-28.2 | [EEP] |
| I | 24-25 | [PEP] |
| J | 19-22 | [PPP] + [PPE] + [EPE] |

The ethylene-propylene triad intensity is shown below in Table 4.

TABLE 4

| Triad | Region Relationship |
|---|---|
| [EEE] | 0.5F + 0.25E |
| [EEP] | H |
| [PEP] | I |
| [PPP] | G |
| [EPP] | D-((H - E)/2) |
| [EPE] | C |

Tables 3 and 4 were used in calculating the triad distribution of ethylene-propylene copolymers. The mole fraction of individual trials was determined by dividing the selected triad intensity by the sum of all the triad intensities.

Example 1 Catalyst Preparation

Silica Calcination:

Silica PD-14024 400 g was loaded into the tube furnace (Model VST 12/600). The silica was calcined at 200° C. for 6 hours under nitrogen atmosphere. A silica catcher, a custom made container capable of connecting to the calcination device with N2 protection, was used to collect the calcined silica from the tube furnace.

Activator MAO Supportation:

In a 4 liter jacket reactor (Ace Glass Inc.), 340 g of calcined PD-14024 silica and 2,380 g of toluene were charged. The reactor was cooled to −10° C. MAO (864 g) (13 mmol Al/g silica) was added slowly through an addition funnel while stirring the slurry at 350 rpm. After completion of the addition, the reaction mixture was stirred at room temperature (23° C.) for 45 min and then heated to 100° C. for 3 hr. The agitator was stopped to allow the solid in the slurry to settle. An H1-NMR spectrum was taken for the supernatant in tetrahydrofuran-d8 (THF-$d_8$). The NMR result did not show detectable MAO in the supernatant. The reaction mixture as is was carried on to the next step of metallocene catalyst supportation. Estimated yield of supported MAO (sMAO) based on starting material charges was 608 g (340 g silica+864 g×31% MAO).

Metallocene Catalyst Supportation:

TIBAL based on 0.34 mmol TIBAL/g sMAO was added to the sMAO slurry in toluene and stirred for 15 min. 10.12 g of Rac-dimethylsilyl(4-(3',5'-di-tert-butyl-4'-methoxyphenyl)-2-methyl-indenyl)(4-o-biphenyl-2-hexyl-indenyl) zirconium dichloride (0.16 wt % Zr/g sMAO) was added into slurry and stirred for 2 hr. The solvent was removed by filtering through the frit at the bottom of 4 liter jacketed reactor and the solid was dried under vacuum for overnight. 622.71 g of peach colored supported catalyst was obtained.

Example 2 Polymerization

Equipment:

2 Liter Zipper Autoclave with heating and cooling controls and connected through a manifold connected to a batch propylene charging line with a volume control device showing the volume in mL, a continuing ethylene feed line with a pressure control device showing the pressure in PSI, a batch hydrogen charging container of 150 mL with a pressure control device showing pressure in psi, and nitrogen line. Before each polymerization test, the reactor was heated to 100° C. for 1 hr under $N_2$ purge.

Mineral Oil Catalyst Slurry Preparation:

5 wt % supported catalyst mineral oil slurry was used for the polymerization. In a 200 ml round bottle took 2.085 g supported catalyst and 38.26 g dried mineral oil. The bottle was shaken on a shaker to obtain a homogeneous suspension.

Example 2a Homo-iPP (Sample P1) Preparation

In the glove box, 1.0 g catalyst mineral oil slurry and 1 ml hexane were loaded into a charge tube. In another charge tube was loaded 1 ml of 5.0 vol % TNOAL. The two charge tubes are equipped with adaptors able to be placed in between either the pressured nitrogen source or propylene source and the reactor by either using the pressured nitrogen or propylene to push the contents in the tubes to the reactor.

Attached the catalyst charge tube to the catalyst charge port and TNOAL charge tube to the scavenger charge port on the reactor. TNOAL was added first to the reactor and following by 250 ml propylene. Started agitator at 450 rpm for 5 min. Started run on reactor controlling software and then added catalyst in the charge tube at 23° C. with 100 ml propylene. Allowed the pre-polymerization at 23° C. for 5 min with the reactor pressure showing 220 psi. Then increased the temperature to 60° C. and run for 10 min with the average reactor pressure showing as 390 psi. Stopped the polymerization reaction by reducing the temperature to ambient and venting the reactor to ambient pressure, collected the polymer, and dried under $N_2$ flow overnight in the hood. Yield: 12 g of homo-iPP (Sample P1).

Note: The conditions of this experiment were intentionally manipulated to control the generation of only a small amount of the stiff sponge like iPP matrix, e.g., 10 wt %, in order to fill in a large amount of EP plastomer generated in the following step, e.g., 90 wt %.

Example 2b iPP-EP Plastomer (Sample P2) Preparation

In the glove box, 1.0 g catalyst mineral oil slurry and 1 ml hexane were loaded into a charge tube. In another charge tube was loaded 1 ml of 5.0 vol % TNOAL. The two charge tubes are equipped with adaptors able to be placed in between either the pressured nitrogen source or propylene source and the reactor by either using the pressured nitrogen or propylene to push the contents in the tubes to the reactor.

iPP Stage (Matrix Phase)

Attached the catalyst charge tube to the catalyst charge port and TNOAL charge tube to the scavenger charge port on the reactor. TNOAL was added first to the reactor and following by 250 ml propylene. Started agitator at 450 rpm for 5 min. Started run on reactor controlling software and then added catalyst in the charge tube at 23° C. with 100 ml propylene. Allowed the pre-polymerization at 23° C. for 5 min. Then increased the temperature to 60° C. and run for 10 min with the average reactor pressure showing 364 psi.
Ethylene-Propylene (EP) Plastomer Stage (Fill Phase)

Reduced the agitation speed to 150 rpm and vented the reactor pressure to 250 psi. Increased agitation to 500 rpm and turned on ethylene feed to add the pressure to total 450 psi and maintained for 60 min. The polymerization reaction was stopped by reducing the temperature to ambient and venting the reactor to ambient pressure, collected the polymer, and dried under $N_2$ flow overnight in the hood. Yield: 126 g of iPP-EP Plastomer (Sample P2).

Note: Because the iPP stage polymerization conditions were similar to Sample P1 that generated 12 g homo-iPP, the final yield of 126 g suggested that the iPP:EP plastomer is 10:90 in weight:weight ratio, which can be verified by HPLC.

Example 2c Propylene Rich Random Copolymer (RCP)-EP Plastomer (Sample P3) Preparation In the glove box, 0.56 g catalyst mineral oil slurry and 1 ml hexane were loaded into a charge tube. In another charge tube was loaded 1 ml of 5.0 vol % TNOAL. The two charge tubes are equipped with adaptors able to be placed in between either the pressured nitrogen source or propylene source and the reactor by either using the pressured nitrogen or propylene to push the contents in the tubes to the reactor.
Propylene Rich RCP Stage (Matrix Phase)

Attached the catalyst charge tube to the catalyst charge port and TNOAL charge tube to the scavenger charge port on the reactor. TNOAL was added first to the reactor and following by 200 ml propylene. The reactor pressure read 300 psi. Turned on the ethylene feed to adjust the reactor total pressure to 330 psi, meaning ethylene pressure 30 psi. Started agitator at 500 rpm and heated the reactor to 60° C. Started run on reactor controlling software and then added catalyst in the charge tube at 60° C. with 100 ml propylene. The reactor pressure read 402 psi. Turned the ethylene pressure up to match 402 psi. Allowed the polymerization at 60° C. for 15 min.
EP Plastomer Stage (Fill Phase)

Increased ethylene pressure to 519 psi (meaning total ethylene pressure 519-402+30=147 psi) and maintained for 60 min. stopped the polymerization reaction by reducing the temperature to ambient and venting the reactor to ambient pressure, collected the polymer, and dried under $N_2$ flow overnight in the hood. Yield: 152 g (RCP)-EP Plastomer (Sample P3).

This experiment demonstrated that a propylene rich low ethylene random copolymer can also serve as the stiff sponge like matrix for plastomer fill.

Example 2d Ethylene Rich RCP-EP Plastomer (Sample P4) Preparation

In the glove box, 0.51 g catalyst mineral oil slurry and 1 ml hexane were loaded into a charge tube. In another charge tube was loaded 1.7 ml of 5.0 vol % TIBAL. The two charge tubes are equipped with adaptors able to be placed in between either the pressured nitrogen source or propylene source and the reactor by either using the pressured nitrogen or propylene to push the contents in the tubes to the reactor.

Ethylene Rich RCP Stage (Matrix Phase)

Attached the catalyst charge tube to the catalyst charge port and TNOAL charge tube to the scavenger charge port on the reactor. TNOAL was added first to the reactor and following by 800 ml propylene. Started agitator at 500 rpm. Allowed to mix at ambient for 5 min. Started run on reactor controlling software and then added catalyst in the charge tube at ambient with 250 ml propylene. Heated the reactor to 60° C. and waited for stable reactor pressure, which showed 375 psi. Added ethylene to 395 psi (20 psi ethylene) and maintained for 30 min.
EP Plastomer Stage (Gas-Phase Polymerization) (Fill Phase)

Increased temperature to 70° C., reduced agitator to 250 rpm, and then slowly vented the reactor pressure to 180 psi, following by adding ethylene to 350 psi total reactor pressure. Increased agitator to 500 rpm and maintained for 30 min. The polymerization reaction was stopped by reducing the temperature to ambient and venting the reactor to ambient pressure, collected the polymer, and dried under $N_2$ flow overnight in the hood. Yield: 203 g Ethylene Rich RCP-EP Plastomer (Sample P4).

This example demonstrated gas-phase polymerization of plastomer in an RCP matrix.

Example 2e iPP-EP Plastomer (Sample P5) Preparation

In the glove box, 1.0 g catalyst mineral slurry and 1 ml hexane were loaded into a charge tube. In another charge tube was loaded 1 ml of 5.0 vol % TNOAL. The two charge tubes are equipped with adaptors able to be placed in between either the pressured nitrogen source or propylene source and the reactor by either using the pressured nitrogen or propylene to push the contents in the tubes to the reactor.
iPP Stage (Matrix Phase)

Attached the catalyst charge tube to the catalyst charge port and TNOAL charge tube to the scavenger charge port on the reactor. TNOAL was added first to the reactor and following by 250 ml propylene. Started agitator at 500 rpm. Allowed to mix at ambient for 5 min. Started run on reactor controlling software and then added catalyst in the charge tube at ambient with 100 ml propylene. After 5 min agitating at ambient, heated the reactor to 70° C. and waited for stable reactor pressure, which showed in between 400 to 450 psi, and allowed to run for 20 min.
EP Plastomer Stage (Fill Phase)

Reduced agitator to 150 rpm, and then slowly vented the reactor pressure to 250 psi, followed by adding ethylene to total reactor pressure 500 psi, i.e., $C_2$ pressure 250 psi. Increased agitation to 500 rpm and maintained for 30 min. The polymerization reaction was stopped by reducing the temperature to ambient and venting the reactor to ambient pressure, collected the polymer, and dried under $N_2$ flow overnight in the hood. Yield: 70 g iPP-EP Plastomer (Sample P5).

Example 2f iPP-EP Plastomer (Sample P6) Preparation

In the glove box, 1.0 g catalyst slurry and 1 ml hexane were loaded into a charge tube. In another charge tube was loaded 1 ml of 5.0 vol % TNOAL. The two charge tubes are equipped with adaptors able to be placed in between either the pressured nitrogen source or propylene source and the reactor by either using the pressured nitrogen or propylene to push the contents in the tubes to the reactor.

iPP Stage (Matrix Phase)

Attached the catalyst charge tube to the catalyst charge port and TNOAL charge tube to the scavenger charge port on the reactor. TNOAL was added first to the reactor and following by 250 ml propylene. Started agitator at 500 rpm. Allowed to mix at ambient for 5 min. Started run on reactor controlling software and then added catalyst in the charge tube at ambient with 100 ml propylene. After 5 min agitating at ambient, heated the reactor to 70° C. and waited for stable reactor pressure, which showed in between 400 to 450 psi, and allowed to run for 15 min.

EP Plastomer Stage

Reduced agitator to 150 rpm, and then slowly vented the reactor pressure to 300 psi, followed by adding ethylene to total reactor pressure 480 psi, i.e., $C_2$ pressure 180 psi. Increased agitator to 500 rpm and maintained for 50 min. The polymerization reaction was stopped by reducing the temperature to ambient and venting the reactor to ambient pressure, collected the polymer, and dried under $N_2$ flow overnight in the hood. Yield: 82 g iPP-EP Plastomer (Sample P6).

Example 3 Polymer Characterization

Example 3a Heterophasic Copolymer Component Quantification by HPLC-SEC

HPLC-SEC was performed on the polymer samples as described above. Example of gradient profiles is as shown in Table 5 below.

TABLE 5

HPLC Gradient Profile

| | Time after injection (min) | | | | |
|---|---|---|---|---|---|
| | 0 | 150 | 170 | 190 | 200 | 300 |
| Vol % of TCB | 0 | 30 | 30 | 50 | 100 | 100 |

Under the conditions above, the HPLC-SEC normalized intensity vs. eluent volume (mL) plots for polymer samples from Example 2 are shown in FIGS. 3-8. The HPLC-SEC results for polymer samples P1-P6 are summarized in Table 6 below.

TABLE 6

HPLC Results for Samples P1-P6

| Sample | Begin of elution (mL) | End of elution (mL) | Propylene in Component* (wt %) | Component (wt %) |
|---|---|---|---|---|
| P1 | 1.1 | 1.7 | 100 (PP) | 50.9 |
| | 3.1 | 4.8 | 100 (PP) | 49.1 |
| P2 | 3.15 | 3.4 | 100 (PP) | 10.3 |
| | 3.4 | 6.95 | 96-75 (Plastomer) | 89.7 |
| P3 | 1.35 | 1.75 | 100 (PP) | 1.1 |
| | 3.05 | 3.8 | 100-95.7 (PP + plastomer) | 55.7 |
| | 3.8 | 6.8 | 95.4-71.4 (Plastomer) | 43.2 |
| P4 | 1.3 | 1.75 | 100 (PP) | 11.8 |
| | 3.1 | 3.75 | 100 (PP) | 24.9 |
| | 4.05 | 6.85 | 75-15.9 (Plastomer) | 63.3 |
| P5 | 0.8 | 3.9 | 100 (PP)** | 31.9 |
| | 3.9 | 7 | 75.3-20.7 (plastomer) | 68.1 |

TABLE 6-continued

HPLC Results for Samples P1-P6

| Sample | Begin of elution (mL) | End of elution (mL) | Propylene in Component* (wt %) | Component (wt %) |
|---|---|---|---|---|
| P6 | 1.15 | 3.5 | 100 (PP)** | 23.2 |
| | 3.5 | 7 | 94.2-52.2 (plastomer) | 76.8 |

*calculated based on CH₃/1000C (the dot distribution in FIGS. 3-8), e.g., if the CH₃ concentration is 333 CH₃/1000C, then the total propylene (CH₃—CH=CH₂) C is 333 × 3 = 999, which is a homo-polypropylene.
**the two iPP components are added together.

Due to the batch propylene charge and continuing ethylene charge, the one reactor sequential polymerization shows the plastomer phase having a decreased propylene content in the normalized intensity vs. elution volume plots, meaning that at the beginning of the copolymerization stage, the plastomer generated has a higher propylene content, but at the end, the propylene content is significantly lower. It can be understood that a narrower methyl distribution (i.e., propylene distribution) or close to fixed ratio of propylene to ethylene can be obtained once both propylene and ethylene are co-fed in a controlled ratio.

Figure 3:
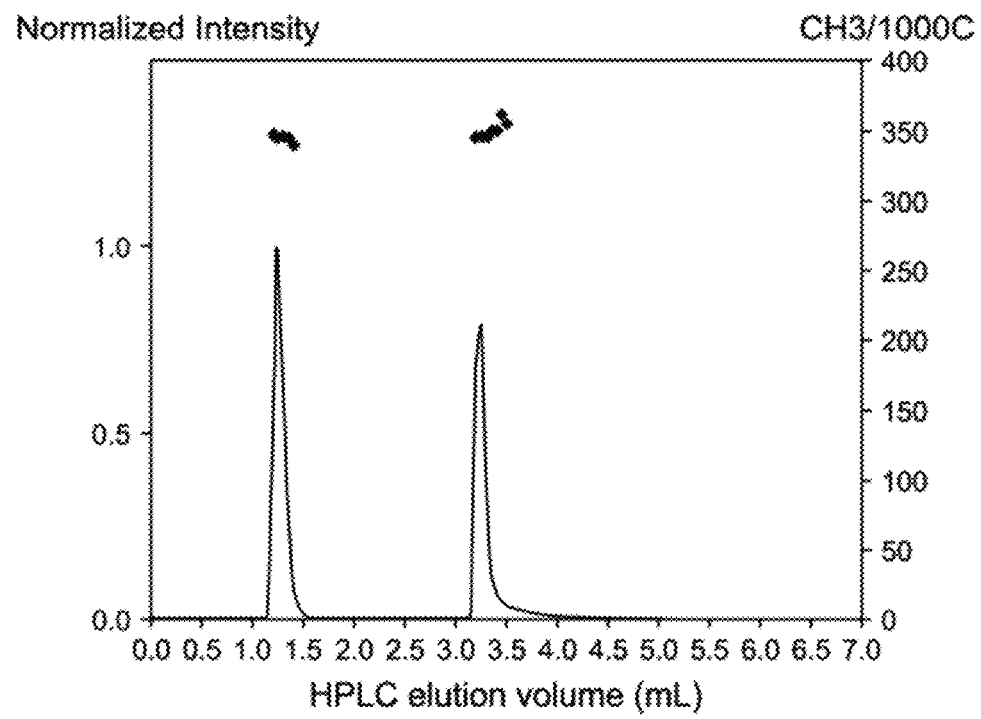
FIG. 3 is a graphical representation of high performance liquid chromatography-size exclusion chromatograph (HPLC-SEC) normalized intensity vs. eluent volume (mL) for polymer Sample P1.
Figure 4:
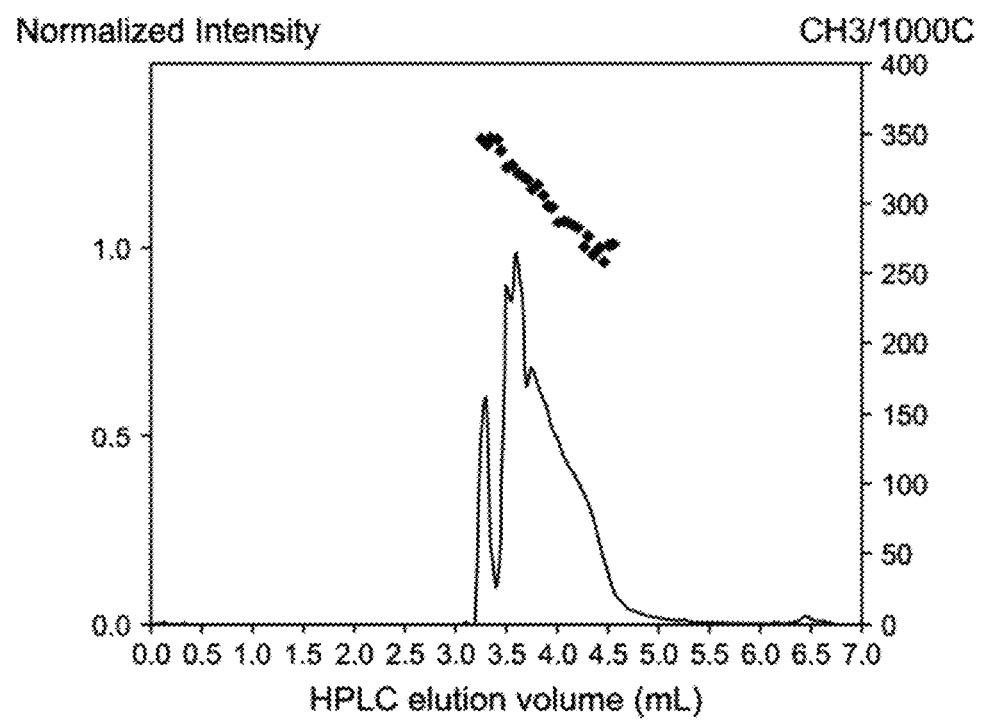
FIG. 4 is a graphical representation of HPLC-SEC normalized intensity vs. eluent volume (mL) for polymer Sample P2.
Figure 5:
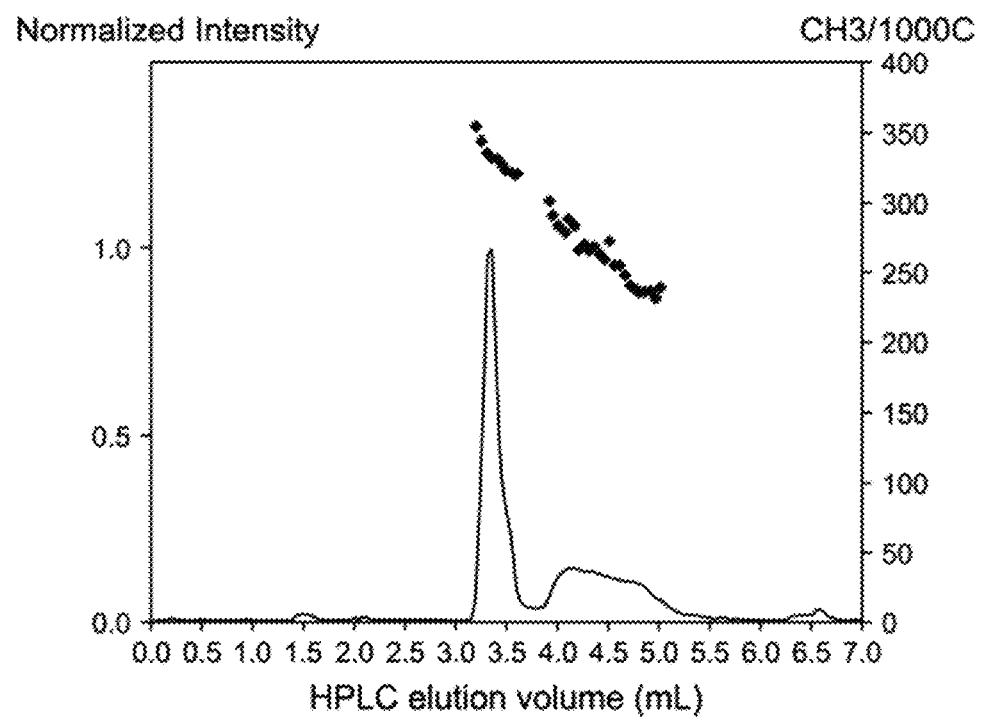
FIG. 5 is a graphical representation of HPLC-SEC normalized intensity vs. eluent volume (mL) for polymer Sample P3.
Figure 6:
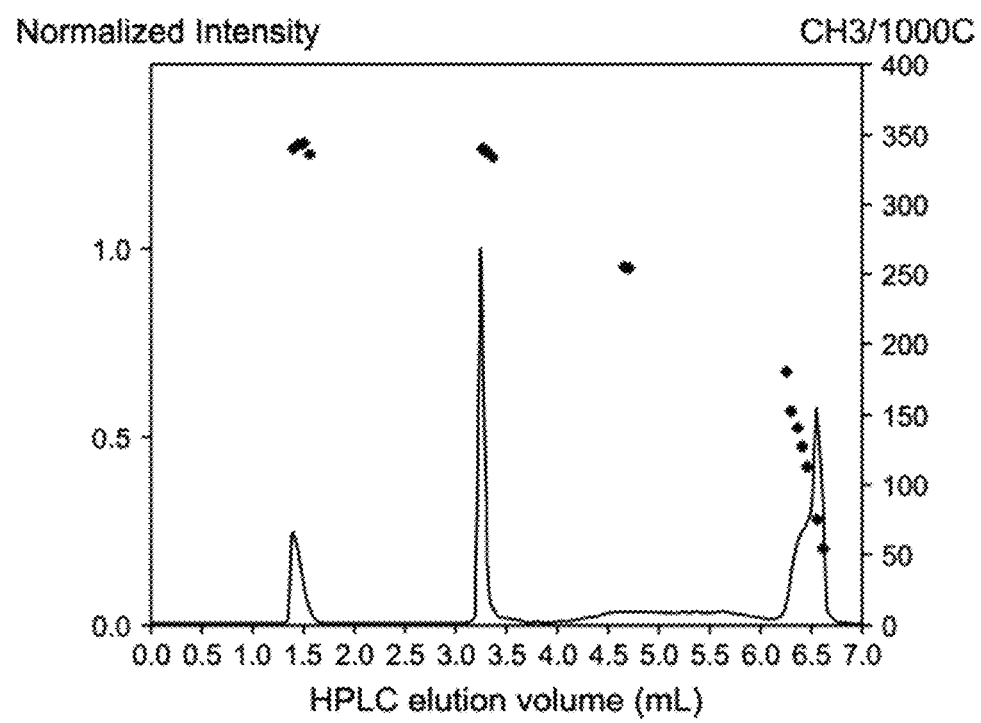
FIG. 6 is a graphical representation of HPLC-SEC normalized intensity vs. eluent volume (mL) for polymer Sample P4.
Figure 7:
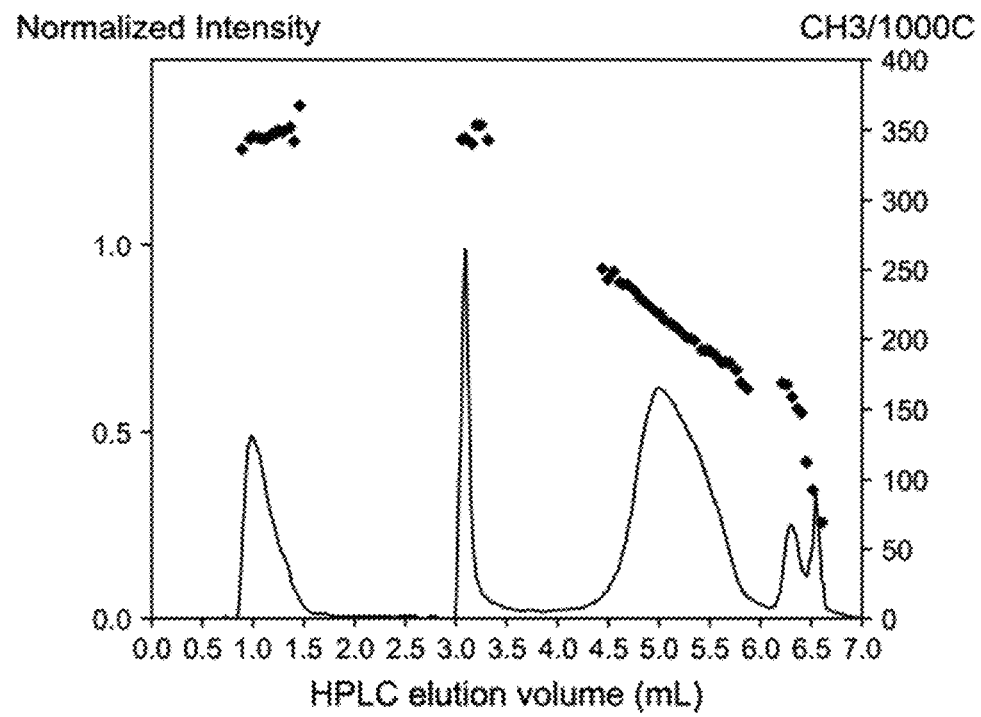
FIG. 7 is a graphical representation of HPLC-SEC normalized intensity vs. eluent volume (mL) for polymer Sample P5.
Figure 8:
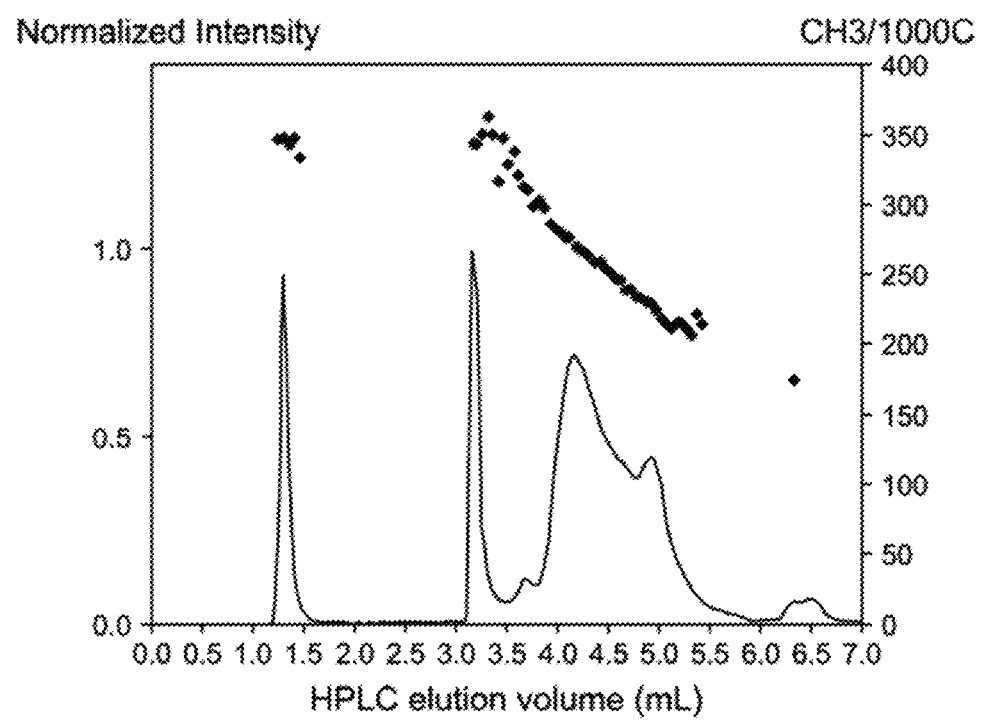
FIG. 8 is a graphical representation of HPLC-SEC normalized intensity vs. eluent volume (mL) for polymer Sample P6.

FIG. 3 shows iPP as two peaks at 1.1 and 3.1 mL elution volume, respectively. This is common observation for different homo-iPP from either metallocene or Ziegler-Natta catalysts using this HLPC method. The reason for the formation of the two peaks has not been fully understood. But it can be seen that the ratio of the two peaks can change if a second phase of polymer is present, e.g., FIG. 4 only shows the peak at 3.1 mL and the peak at 1.1 mL is missing, whereas FIG. 5 and FIG. 6 both show 1.3 mL peaks for the iPP rich phase with a small amount of ethylene incorporation (RCP), which is likely the cause of a slight delay of elution, i.e., 1.1 mL vs. 1.3 mL. Peaks identified as homo-polypropylene are based on the CH3 concentration of 333/1,000C.

Three different plastomers with different propylene-ethylene ratios were prepared: P2 contains a propylene rich plastomer composition; P3 contains an elastomer like composition, i.e., ethylene and propylene contents are comparable; and P4 contains an ethylene rich plastomer.

Heterophasic Copolymer Crystallinity Determination by DSC

DSC methods as described above were performed on samples P1, P2, P3, P4, P5 and P6, and the results are shown in Table 7 below. The table doesn't include the fill phase data because they are difficult to reproduce and only appear in the first melt, presumably due to in a multi-phasic environment.

TABLE 7

Crystallization Temperature, Melting Temperature, and Heat of Fusion

| Sample | $1^{st}$ Tc (° C.) | $1^{st}$ HOFc (j/g) | $1^{st}$ Tm (° C.) | $1^{st}$ HOFm (j/g) | $2^{nd}$ Tm (° C.) | $2^{nd}$ HOFm (j/g) |
|---|---|---|---|---|---|---|
| P1 | 111.02 | 87.22 | NR | NR | 152.33 | 89.25 |
| P2 | 102.87 | 18.11 | 148.16 | 14.39 | 148.16 | 15.53 |
| P3 | 88.84 | 54.01 | 116.27 | 22.15 | 123.36 | 30.18 |
| P4 | 89.19 | 19.95 | NR | NR | 125.96 | 19.16 |
| P5 | 99.96 | 14.74 | 149.72 | 9.33 | 150.01 | 9.95 |
| P6 | 112.98 | 21.13 | 150.91 | 18.40 | 151.25 | 21.25 |

Tc = crystallization temperature;
HOFc = crystallization heat of fusion;
Tm = melting temperature;
HOFm = melting heat of fusion;
NR = not recorded Molecular Weight and Ethylene Content of Heterophasic Copolymer Components GPC-4D and $C^{13}$-NMR methods as described above were used to obtain molecular weight and ethylene content in the sticky plastomer phase, and total C2 incorporation in the heterophasic copolymer samples. Both GPC-4D and $C^{13}$ NMR results are shown below in Table 8.

TABLE 8

GPC and NMR Results for Bi-Phasic Copolymer Molecular Weight and Ethylene Content

| Method | GPC-4D | | | $C^{13}$ NMR |
|---|---|---|---|---|
| Sample ID | Total Mw (k) | Fill Phase Mw (k) | Fill Phase C2 (wt %) | Total C2 (wt %) |
| P1 | 998 | NA | NA | NA |
| P2 | 589 | 396 | 17.76 | 11.6 |
| P3 | 600 | NR | NR | 15.4 |
| P4 | 422 | NR | NR | 43.2 |
| P5 | 650 | 232 | 38.33 | 28.4 |
| P6 | 596 | 287 | 26.89 | 21.4 |

NA = not applicable;
NR = not recorded

Domain and Border Analysis for Heterophasic Plastomer Granules

Experimental Method

The reactor made heterophasic plastomer granules were embedded in Norland Electronic Adhesive and cured under UV light for 20 minutes. The granules were cross-sectioned with a room temperature microtome using a diamond knife. 200 nm sections were taken off with a speed of 0.1 mm/s to create the flat "face" of the granule cross-sections. The faced samples were then stained with $RuO_4$ vapors for 3 hours and analyzed in a Hitachi S-4300 field emission scanning electron microscope (FE-SEM) at 1 kV in secondary electron mode.

Analytical Method

ImagePro software was used to manually measure domain areas and border widths. Domain statistics and percentage of domain area to total area measurements.

Figure 9:
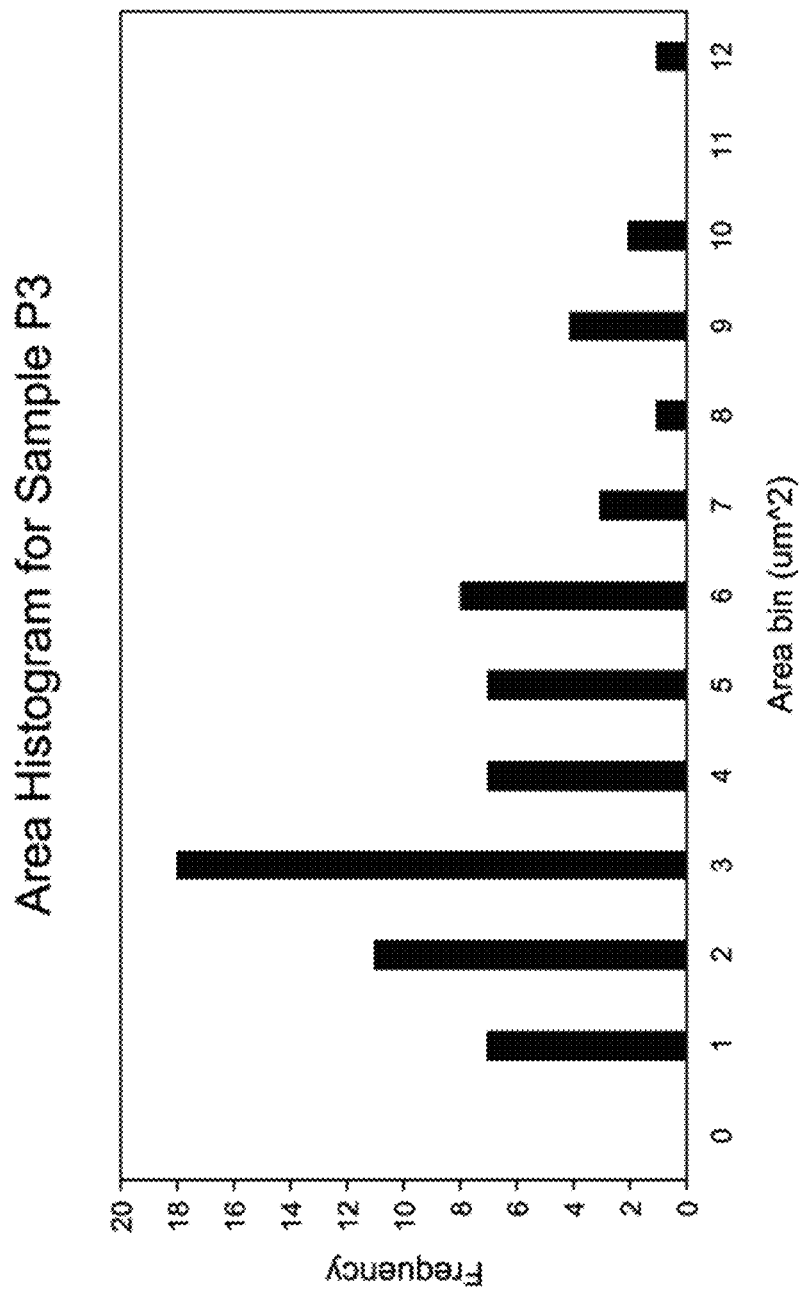
FIG. 9 is a domain area histogram for polymer Sample P3.
Figure 10:
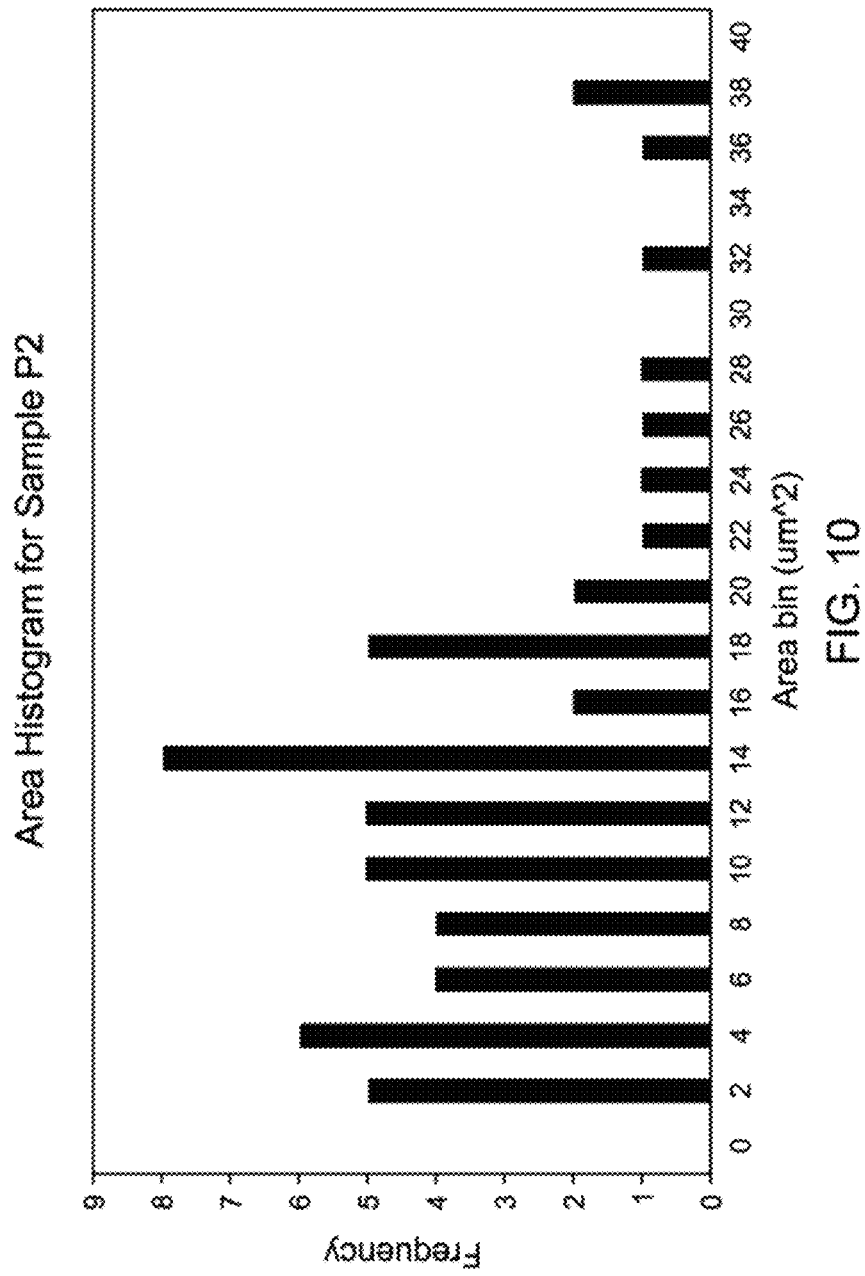
FIG. 10 is a domain area histogram for polymer Sample P2.

Percentage of domain area vs. total area was measured for 4 bulk areas of at least 100 $um^2$ for each sample. See below for the average and standard deviation of percent domain area measured for each sample. 50 individual domains were measured for each sample. The histograms for Sample P3 and Sample P2 are shown in FIGS. 9 and 10, respectively (note that histograms in Excel were constructed so that the bins include values that were less than or equal to that bin). The average, min and max for the area measurements are provided below in Table 9 for Sample P3 and Sample P2.

TABLE 9

| | Domain Area | |
|---|---|---|
| | Sample P3 | Sample P2 |
| Average domain area | 3.7 $um^2$ with standard deviation 2.5 $um^2$ | 12.2 $um^2$ with standard deviation 8.8 $um^2$ |

TABLE 9-continued

| | Domain Area | |
|---|---|---|
| | Sample P3 | Sample P2 |
| Minimum domain area | 0.5 $um^2$ | 0.8 $um^2$ |
| Maximum domain area | 11.4 $um^2$ | 37.5 $um^2$ |
| Percent domain area of total area | 54.4% with standard deviation of 2.2% | 60.4% with standard deviation of 5.8% |

Border Measurements

Figure 11A:
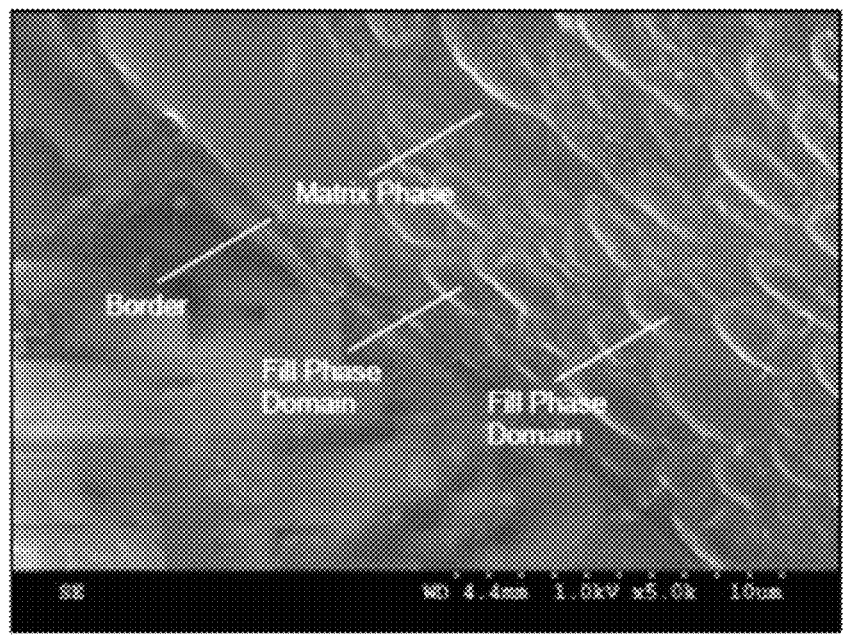
FIGS. 11a and 11b are two cross-sectional $RuO_4$ vapor-stained scanning electron microscope (SEM) images cut through different orientation of a granule, respectively, of polymer Sample P3.
Figure 11B:
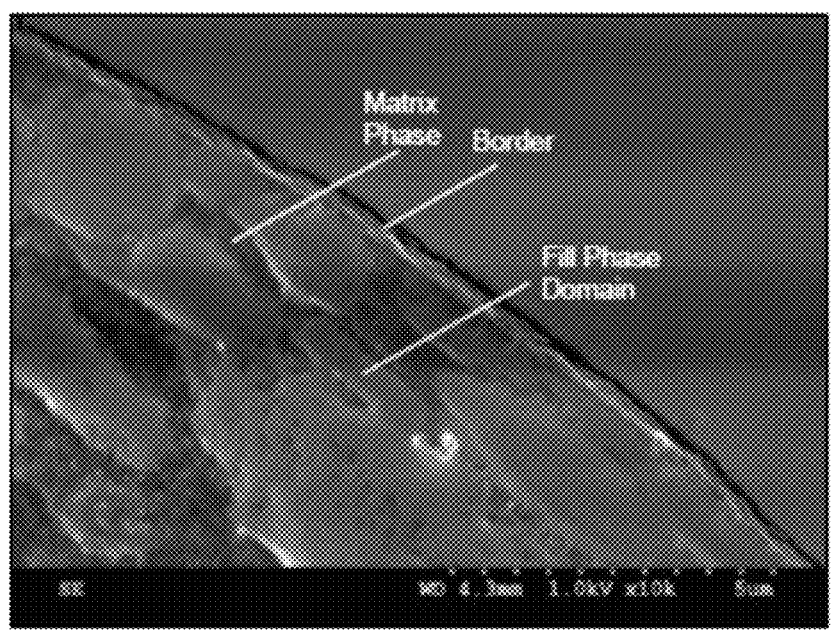
Figure 12A:
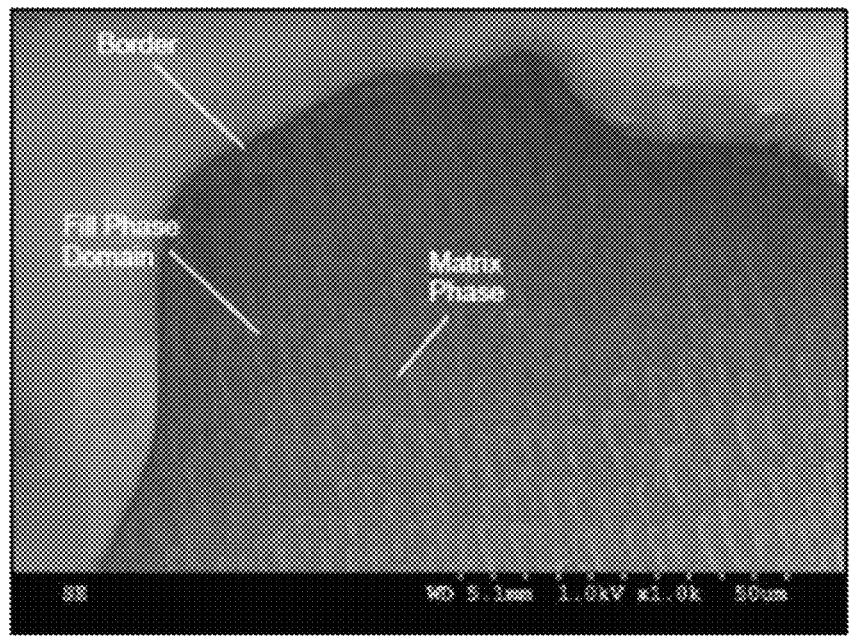
FIGS. 12a and 12b are two cross-sectional $RuO_4$ vapor-stained SEM images cut through different orientation of a granule, respectively, of polymer Sample P2.
Figure 12B:
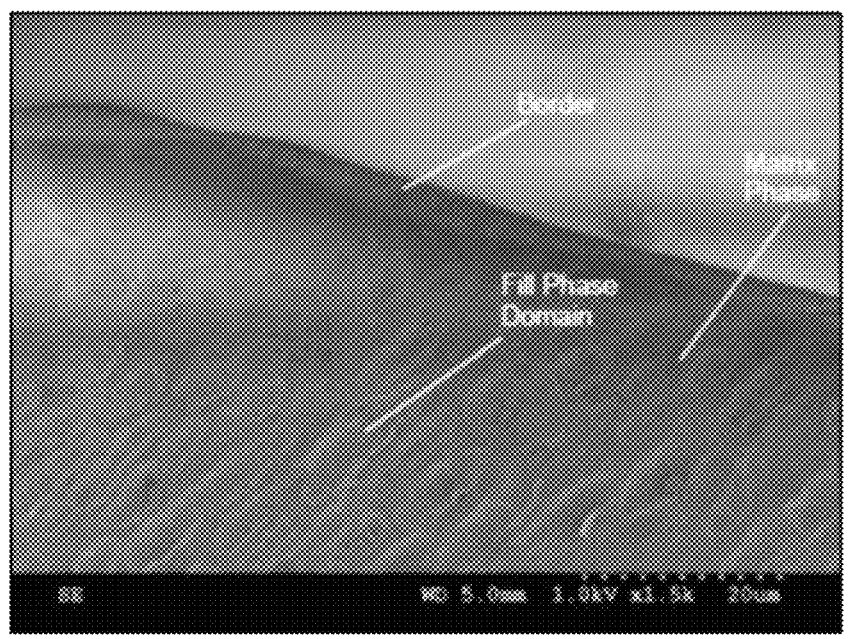

Two images for each sample were analyzed and the borders of each image were measured every 2-5 μm and the average, minimum and maximum border widths were measured. FIG. 11a is a first image (image 1) of sample P3 and FIG. 11b is a second image (image 2) of sample P3. FIG. 12a is a first image (image 1) of sample P2 and FIG. 12b is a second image (image 2) of sample P2. The average border widths are provided in Table 10 below.

TABLE 10

| | Border Width |
|---|---|
| | Average Border Width |
| Sample P3, Image 1 | 0.71 μm with standard deviation 0.07 μm |
| Sample P3, Image 2 | 0.31 μm with standard deviation 0.01 μm |
| Sample P2, Image 1 | 2.8 μm with standard deviation 1.0 μm |
| Sample P2, Image 2 | 2.3 μm with standard deviation 0.6 μm |

Example 4 Granule Stickiness Quantification

Figure 13:
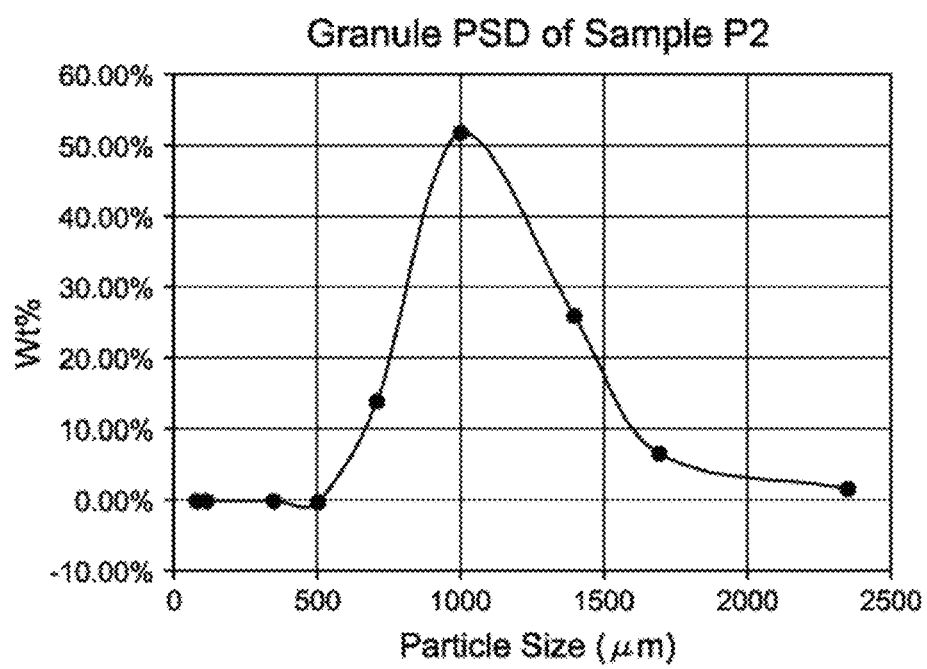
FIG. 13 is graphical representation of particle size distribution for polymer Sample P2.
Figure 14:
FIG. 14 is an optical image of particles of polymer Sample P2.

If the reactor made granules are sticky, they would be expected to agglomerate and change the particle size distribution. A mechanical sieve shaker with a series of different mess size sieve pans was used to obtain particle size distribution curve to judge the stickiness. If a to Gaussian or Gaussian like distribution curve was obtained at room temperature (23° C.), the granules were defined as non-sticky. Examples of sieve shakers used are those commercially available standard sieve shakers, e.g., Meinzer II Sieve Shaker, CSC Scientific, Model #Meinz 110 (115V, 60 Hz). 8" Test Sieves, Brass sieve pans were used. The sieves were made in compliance to the current ASTM E11 and ISO 3310 specifications. A total of 9 sieve pans were used for PSD curve with the mess size of 90 μm, 125 μm, 355 μm, 710 μm, 1.0 mm, 1.4 mm, 1.7 mm and 2.3 mm. Table 11 provides the results for Sample P2, which represents a high C2 content as shown in Table 5, and the related plot is shown as FIG. 13. The optical image of sample P2 is shown in FIG. 14.

TABLE 11

Granule Particle Size Distribution of Sample P2

| Mess size(μm) | Weight (g) | Wt % | Accumulation |
|---|---|---|---|
| 90 | 0 | 0.00% | 0.00% |
| 125 | 0 | 0.00% | 0.00% |
| 355 | 0 | 0.00% | 0.00% |
| 500 | 0 | 0.00% | 0.00% |
| 710 | 13.23 | 14.12% | 14.12% |
| 1000 | 48.35 | 51.62% | 65.74% |

TABLE 11-continued

Granule Particle Size Distribution of Sample P2

| Mess size(μm) | Weight (g) | Wt % | Accumulation |
|---|---|---|---|
| 1400 | 24.29 | 25.93% | 91.67% |
| 1700 | 6.2 | 6.62% | 98.29% |
| 2360 | 1.6 | 1.71% | 100.00% |
| Total | 93.67 | | |

Figure 15:
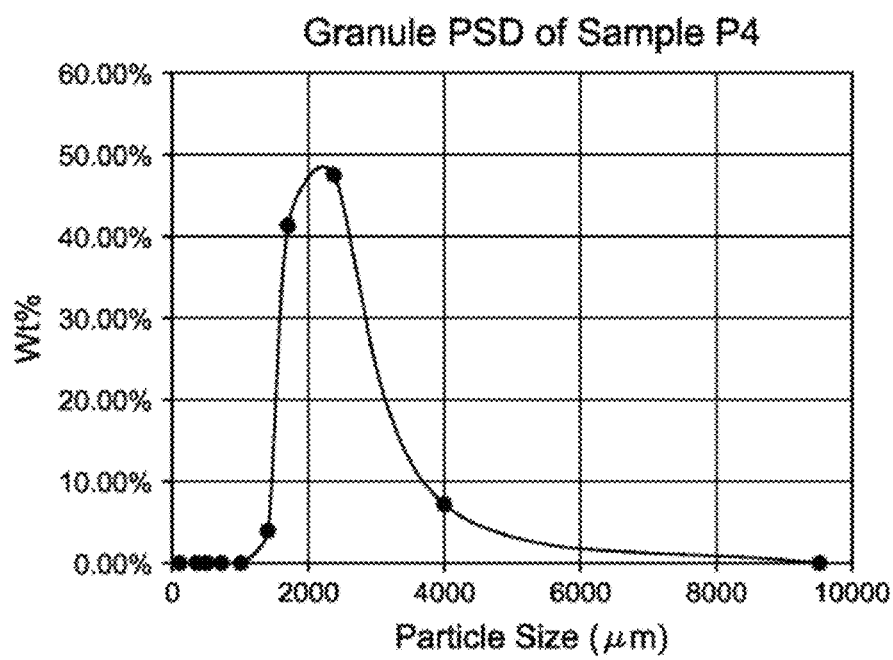
FIG. 15 is the particle size distribution plot for Sample P4.
Figure 16:
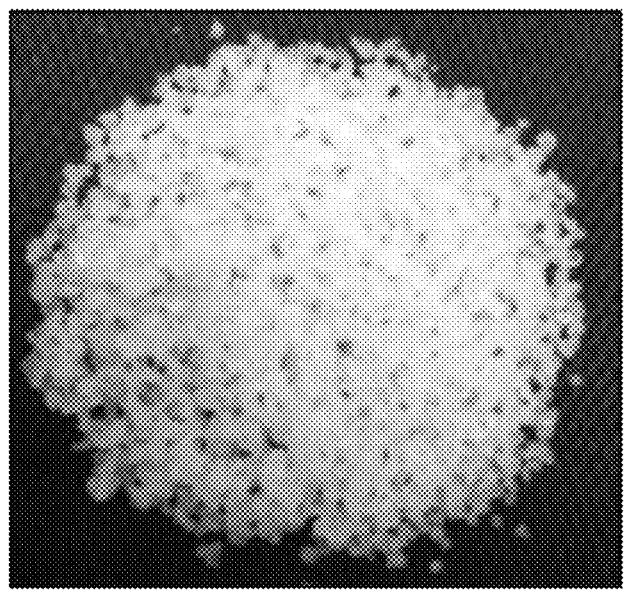
FIG. 16 is an optical image of particles of polymer Sample P4.

Table 12 provides the result for Sample P4, which represents a high C2 content as shown in Table 8, and the related plot is shown as FIG. 15. The optical image of Sample P4 is shown as FIG. 16.

TABLE 12

Granule Particle Size Distribution of Sample P4

| Mesh size(μm) | Weight (g) | Wt % | Accumulation % |
|---|---|---|---|
| 90 | 0 | 0 | 0 |
| 125 | 0 | 0 | 0 |
| 355 | 0 | 0 | 0 |
| 500 | 0 | 0 | 0 |
| 710 | 0 | 0 | 0 |
| 1000 | 0.11 | 0.13 | 0.13 |
| 1400 | 3.51 | 4.08 | 4.21 |
| 1700 | 35.46 | 41.19 | 45.40 |
| 2360 | 40.83 | 47.43 | 92.83 |
| 4000 | 6.17 | 7.17 | 100 |
| 9500 | 0 | 0 | 100 |
| Total (g) | 86.08 | — | — |

Figure 17A:
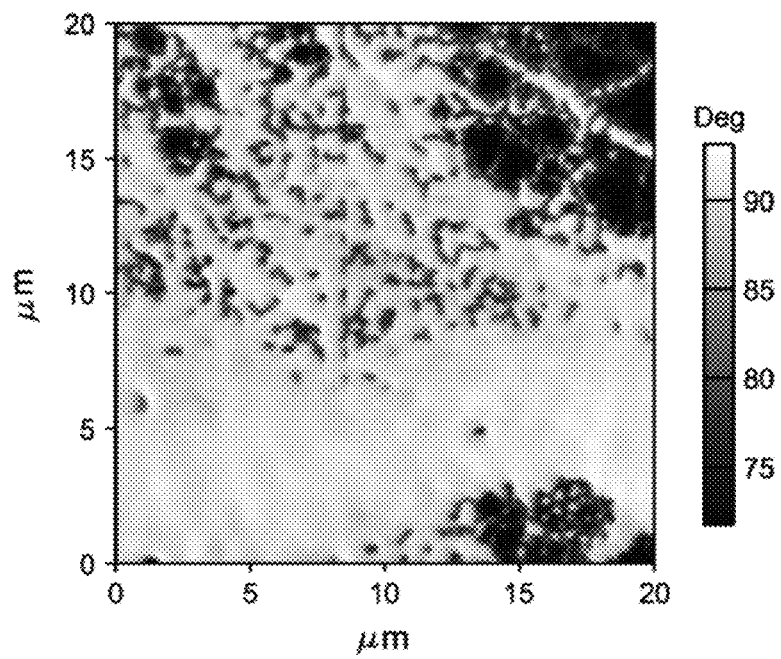
FIGS. 17a and 17b are atomic force microscopy (AFM) images of a granule of Sample P4 at 30 minutes and 1 hour after microtoming, respectively.
Figure 17B:
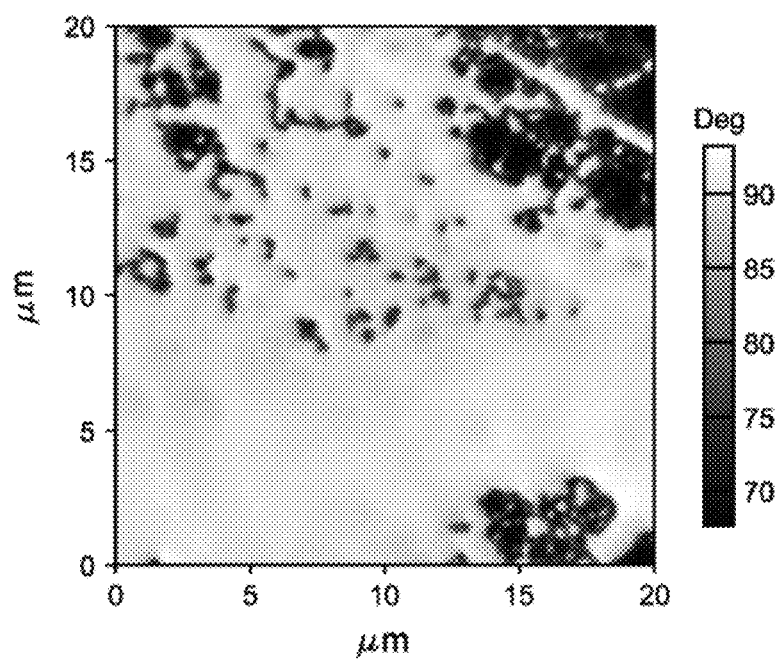

Example 5 to Evidence of Heterophasic Plastomer Granule Border being a Stiff Phase Although the plastomer/elastomer growing mechanism based on experimental observation indicated that a sticky plastomer was coated outside the stiff polymer subglobules. The formation of a thin layer of border outside a granule may be a stiff material, e.g., iPP or to low C2 RCP. The evidence to support this observation of plastomer flowing after a granule was cut open was after microtoming and monitored with time through a standard atomic force microscopy (AFM) method. FIGS. 17a and 17b compares the cut section where plastomer flowing can be observed over time. FIG. 17a was taken of granule of Sample P4 30 min after microtoming and FIG. 17b was taken of granule 1 hour after microtoming.

Therefore, not only the high surface area and sub-particle containing silica structure enable the housing of a high content of sticky phase as small domains in the middle of a granule particle, the thin layer of stiff material coated outside the granule likely provide protection as well.

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including". Likewise whenever a composition, an element or a group of elements is preceded with the transitional phrase "comprising", it is understood that we also contemplate the same composition or group of elements with transitional phrases "consisting essentially of", "consisting of", "selected from the group consisting of", or "is" preceding the recitation of the composition, element, or elements and vice versa.

The invention claimed is:

1. A heterophasic copolymer comprising:
   1) a matrix phase having a melting point of at least 100° C. and comprising:
      (i) at least 95 mol % propylene-derived units; or
      (ii) at least 95 mol % ethylene-derived units; and
      wherein the matrix phase is a structure having open pores and an average granule border of up to 3 μm and wherein the matrix phase comprises at least 8 wt % of the heterophasic copolymer, based on the total weight of the matrix and fill phases; and
   2) a fill phase present as domains at least partially filling pores in the matrix phase, wherein the fill phase comprises:
      (i) at least 60 mol % propylene-derived units and at least 5 mol % ethylene-derived units; or
      (ii) at least 60 mol % ethylene-derived units and at least 5 mol % propylene-derived units; and
   3) the heterophasic copolymer having a 2nd melt heat of fusion less than or equal to 85 J/g for propylene based fill phase and 120 J/g for ethylene based fill phase for the entire heterophasic polymer, wherein the domains have an average area of 0.5 to 20 μm², and wherein the fill phase comprises at least 60 wt % of the heterophasic copolymer, based on the total weight of the matrix and fill phases, and the heterophasic copolymer having reactor made granules with at least 90 wt % of the granules having particle sizes distributed in a range of 100 to 6000 μm.

2. The heterophasic copolymer of claim 1, wherein the granules of the copolymer have an average particle size of 1 mm to 4 mm.

3. The heterophasic copolymer of claim 1, wherein the matrix phase comprises: (i) 95 to 100 mol % propylene-derived units and 0 to 5 mol % ethylene-derived units; or (ii) 95 to 100 mol % ethylene-derived units and 0 to 5 mol % $C_4$-$C_{10}$ alpha olefin-derived units.

4. The heterophasic copolymer of claim 1, wherein the fill phase comprises: (i) 60 to 95 mol % propylene-derived units and 5 to 40 mol % ethylene-derived units; or (ii) 60 to 95 mol % ethylene-derived units and 5 to 40 mol % propylene-derived units.

5. The heterophasic copolymer of claim 1 has a heat of fusion of 5 to 85 J/g for propylene based polymers and 5 to 120 J/g for ethylene based polymers.

6. The heterophasic copolymer of claim 1, wherein the total area of the domains is at least 40% of the total area of the heterophasic copolymer.

7. The heterophasic copolymer of claim 1, wherein the matrix phase comprises at 10 to 40 wt % of the heterophasic copolymer, and the fill phase comprises at 60 to 90 wt % of the heterophasic copolymer, based on the total weight of the matrix and fill phases.

8. The heterophasic copolymer of claim 1, wherein the heterophasic copolymer has an Mw of 200,000 to 1,000,000 g/mol.

9. The heterophasic copolymer of claim 1, further comprising an outer shell comprising isotactic-polypropylene (iPP), wherein the outer shell has a thickness of 200 to 1000 nm.

* * * * *